Dec. 15, 1964  D. W. JOHNSON ETAL  3,161,365
UNCOILER CONTROL SYSTEM
Filed Feb. 23, 1962  14 Sheets-Sheet 1

INVENTORS
DONALD W. JOHNSON
KENNETH R. THOMPSON
BY
Robert P. Strack
ATTORNEY

INVENTORS
DONALD W. JOHNSON
KENNETH R. THOMPSON
BY
*Robert R. Strack*
ATTORNEY

Dec. 15, 1964   D. W. JOHNSON ETAL   3,161,365
UNCOILER CONTROL SYSTEM
Filed Feb. 23, 1962   14 Sheets-Sheet 3

INVENTORS
DONALD W. JOHNSON
KENNETH R. THOMPSON
BY
*Robert R. Strack*
ATTORNEY

INVENTORS
DONALD W. JOHNSON
KENNETH R. THOMPSON
BY
Robert R. Strack
ATTORNEY

INVENTORS
DONALD W. JOHNSON
KENNETH R. THOMPSON
BY
*Robert R. Strack*
ATTORNEY

Dec. 15, 1964     D. W. JOHNSON ETAL     3,161,365
UNCOILER CONTROL SYSTEM
Filed Feb. 23, 1962     14 Sheets-Sheet 12

INVENTORS
DONALD W. JOHNSON
KENNETH R. THOMPSON
BY Robert R. Struck
ATTORNEY

Dec. 15, 1964    D. W. JOHNSON ETAL    3,161,365
UNCOILER CONTROL SYSTEM
Filed Feb. 23, 1962    14 Sheets-Sheet 14

INVENTORS
DONALD W. JOHNSON
BY    KENNETH R. THOMPSON

Robert P. Strack
ATTORNEY ial from reels, coils, and the like. More particularly, it relates to control systems for selectively slowing or stopping an unwinding process to retain a desired number of wraps on a reel, coil, or the like, when the equipment is slowed or stopped.

United States Patent Office 3,161,365
Patented Dec. 15, 1964

3,161,365
UNCOILER CONTROL SYSTEM
Donald W. Johnson and Kenneth R. Thompson, Roanoke, Va., assignors to General Electric Company, a corporation of New York
Filed Feb. 23, 1962, Ser. No. 175,177
13 Claims. (Cl. 242—57)

This invention relates to control systems for unwinding material from reels, coils, and the like. More particularly, it relates to control systems for selectively slowing or stopping an unwinding process to retain a desired number of wraps on a reel, coil, or the like, when the equipment is slowed or stopped.

The problems of controllably unwinding material from a reel are encountered throughout a wide spectrum of industry from motion picture projection to the production of metal products. In many instances, the material is unwound from a reel and transported to a second storage point after processing at some intermediate point. For example: in the case of film projection, the film is unwound from a first reel, passed in front of a projecting source, and rewound upon a second reel; and in the case of annealing sheet metal materials, the material is unwound from a first reel, passed through an annealing oven, and rewound or further processed at a subsequent point. Obvious requirements of control systems for unwinding operations of the nature described include accurate control over the velocity, elimination of stoppage during processing, and reliable detection of the approaching end of the material. The relative importance of the requirements is determined by the particular use involved.

An object of the present invention is to provide an improved control system for detecting the approaching end of a material which is being unwound from a reel.

While detection of an approaching end is important in many instances, it is of particular importance in the case of metal sheet annealing. The equipment employed in metal sheet annealing comprises an annealing oven through which the metal sheet is guided at a constant velocity. Large looping devices at the entry and exit sides of the oven provide sufficient surplus material to permit temporary speed variations in the feed or take-up mechanisms. The hourly cost of operating an annealing line is high and is rendered higher by slow operation and unnecessary down time.

The method of operation generally includes unwinding a particular reel until the end is near and then manually slowing the reel while visually observing it until the end appears. If a length of material near the end is imperfect it is sheared off, the beginning of a new coil is welded to the good end, and the equipment is accelerated to continue the process. In this way, the oven receives continuous material and there is no need for an expensive rethreading operation. Furthermore, if the end of the strip were permitted to go through the ovens at the normal processing velocity, the whipping action of the end might very well cause structural damage.

Under present practices, an operator depends upon either a predetermined wrap count, or a visual observation, to initiate stopping of the unwinding operation. This gives rise to difficulties because the number of wraps for a given diameter on the reel differs with the thickness of the material being processed. Also, the nature of the annealing equipment makes visual observation difficult.

Another object of the invention is to automatically generate a signal for stopping a payoff reel when a predetermined length of material remains on the reel.

Still another object of the invention is to provide a control system that may be used in conjunction with either manual operation, automatic stopping operation, or automatic slowdown operation, which provides a signal when a known amount of material remains on the reel.

In accordance with an illustrative embodiment of the invention, the speed of a payoff reel is compared with the speed of a known diameter bridle that is coupled to the material being paid off. From this comparision the diameter of the coil at any point may be calculated. A particular diameter is selected and the number of wraps on the reel at that particular diameter is calculated on the basis of the known thickness of the material. Once the number of wraps on the reel is determined, the number of wraps that are subsequently unwound are counted, until a predetermined remainder is attained; the number of wraps unwound, being equal to the difference between the calculated number and the predetermined remainder.

Because a first discrete time interval elapses between the generation of a stop signal and deceleration, and a second discrete time interval elapses during deceleration, a number of wraps are necessarily unwound between the time of signal generation and the time the predetermined remainder is attained. The number of wraps unwound during slowdown is a function of the speed of the material and must be considered in determining at what instant the stop signal is generated. Consequently, means responsive to speed is provided for automatically calculating the number of wraps that will be unwound during stopping. The speed used for this calculation is determined just prior to the time the aforementioned particular diameter is detected. Information is thus accumulated comprising the number of wraps on the reel, and the number of wraps that will be unwound during stopping. The latter number is preset into a counter, and when said particular diameter is detected the counter is pulsed by pulses occurring at a rate proportional to the velocity of the payoff reel. When the number registered in the counter is commensurate with the number of wraps calculated to be on the reel at said particular diameter, the stop signal is generated. The equipment thereupon decelerates to a slow or stop condition with the selected number of wraps remaining on the reel.

A feature of the invention relates to means for determining the diameter of a coil by comparison of the speed of the unwinding reel with the speed of a known diameter element that is coupled to the unwinding material.

Another feature of the invention relates to means for calculating the number of wraps that will be uncoiled during actual deceleration in response thereto.

Another feature of the invention relates to means for calculating the number of wraps that will be uncoiled during deceleration of a payoff reel.

The novel features of the invention are set forth with particularity in the appended claims. The invention itself, however, both as to its organization and method of operation, together with further objects and features thereof may best be understood by reference to the following description taken in conjunction with the drawings wherein:

FIGS. 1 and 2 comprise a simplified block schematic illustrating the functions performed by an illustrative embodiment of the invention;

GENERAL DESCRIPTION

Figure 1:
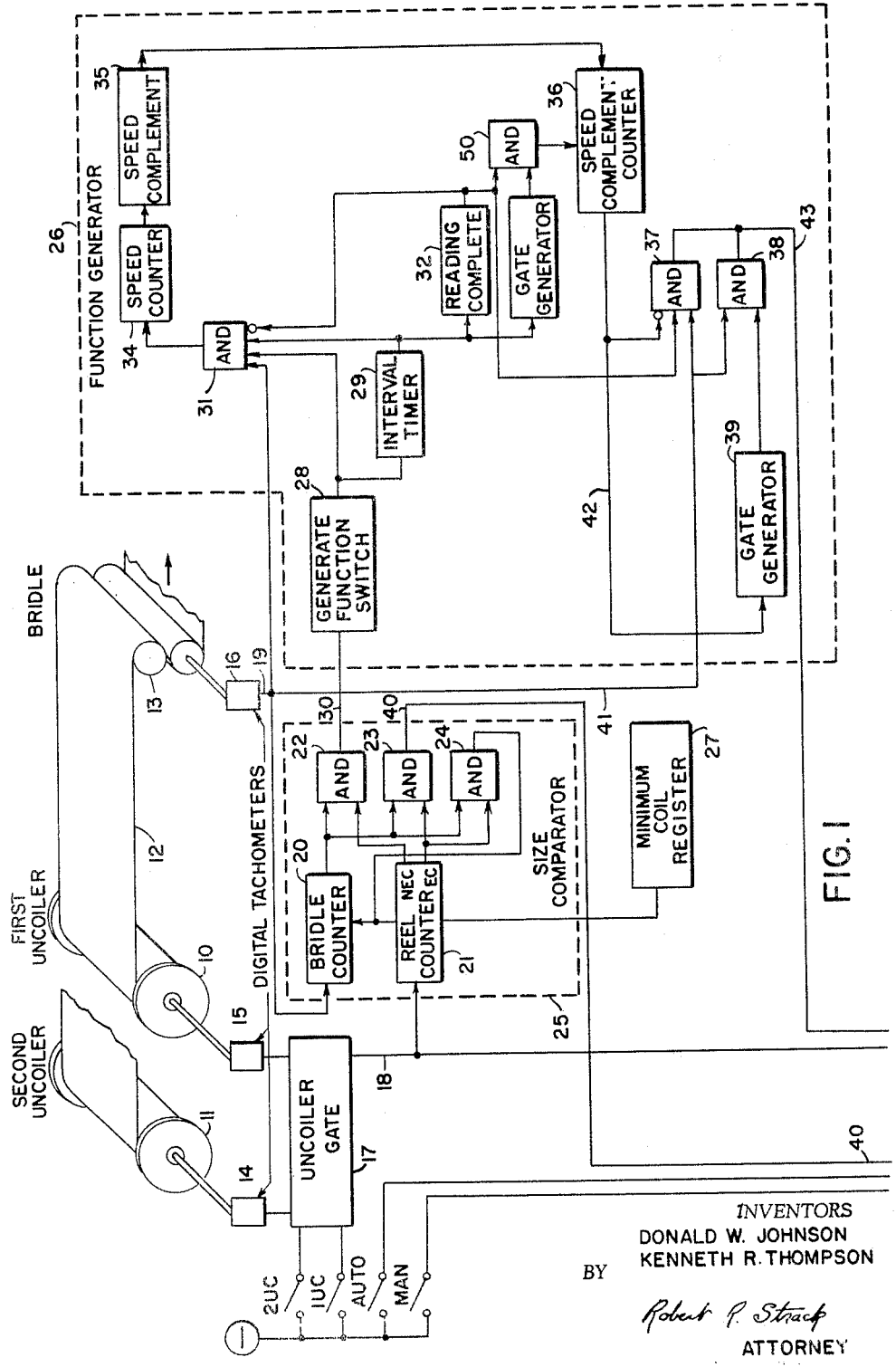
Figure 2:
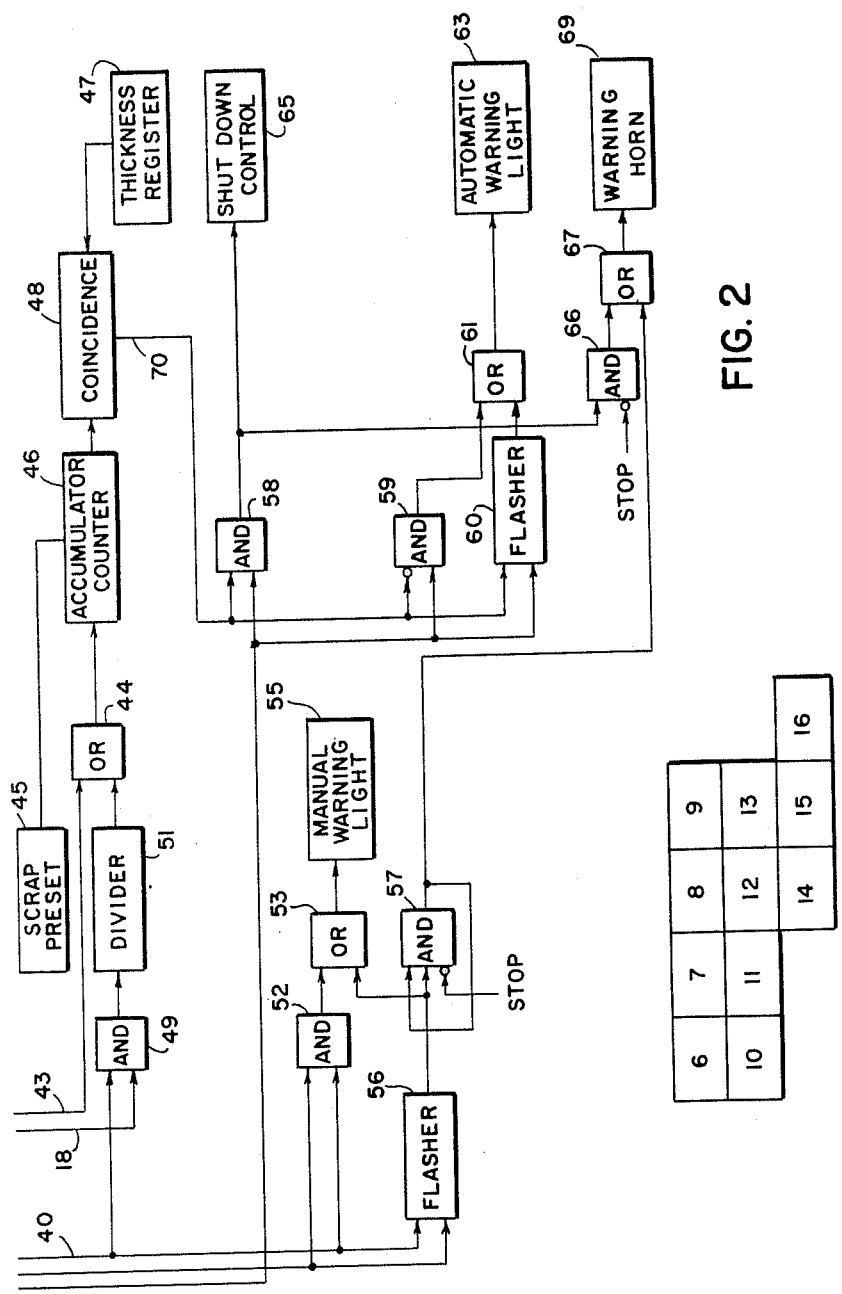

Before proceeding with a detailed consideration of an illustrative embodiment of the invention, an understanding of the functions that combine to achieve the objectives of the present invention may be had by considering the functional block schematic obtained by placing FIG. 1 directly above FIG. 2.

In FIG. 1, a first uncoiler 10 and a second uncoiler 11 are illustrated as bearing a strip material 12 which is to be processed by subsequent equipment (not shown). In the illustration, the material on first uncoiler 10 is presently being processed. It passes over bridle rolls 13 on the way to the processing equipment. Digital tachometers 14, 15, and 16 are connected to the uncoilers and bridle rolls and provide pulse trains having repetition rates commensurate with the rotational velocity of their associated uncoiler or bridle.

As previously noted, the control system automatically calculates several numbers that are functions of the speed of the strip material. The bridle digital tachometer 16 yields this speed information. The uncoiler digital tachometers 14 and 15 provide an output which, by comparison with the output of bridle tachometer 16, permits the detection of a predetermined diameter of coil upon the uncoiler from which further calculations may be automatically made.

Figure 5:
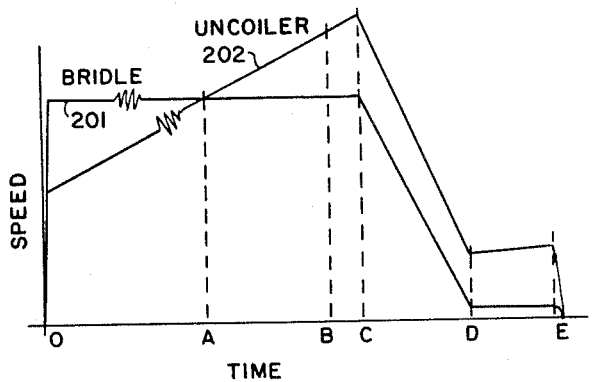
FIG. 5 is a typical graph illustrating the speed of an uncoiler and a bridle as a function of time.

FIG. 5 is a graph illustrating the comparative rotational velocities of a typical bridle and uncoiler throughout a complete operating cycle. The graph illustrates speed as a function of time wherein the time extends from "O" at start-up, to "E" when the uncoiler is completely emptied of material. Bridle speed 201 is directly indicative of the velocity of the material 12. As shown, and as required by the processing, the material moves at a constant velocity up until the time of deceleration immediately before stopping. At time B, it is determined that the end of the material 12 is near and stopping must be initiated. The stop signal is then generated; however, it is not until time C that the equipment responds and actually begins to decelerate. From time C to time D, the material feed is decelerated at a constant rate by equipment not included in this description. At time D, in accordance with calculations to be described hereinafter, a predetermined amount of material is left on the uncoiler. Depending upon the operation desired, the uncoiler may be stopped at this time or it may be permitted to continue operation at a slow rate until the reel is completely emptied of its material at time E. As shown, the bridle speed at this time goes to zero.

During the unwinding process, the uncoiler initially starts at a relatively slow speed and accelerates as its diameter decreases. This is illustrated by speed curve 202 during interval O to time C. At time C, the uncoiler begins deceleration. This continues until the material speed is either zero or a predetermined slow rate at time D. At this time, a predetermined number of wraps remain on the uncoiler, and if operation is continued until time E, the uncoiler speed will again slowly accelerate until the end of the coil is reached. Of course, if no material is to be left on the reel, time D would be the end of the operation and curves 201 and 202 would drop to zero at this time.

Two factors are apparent from the graph in FIG. 5. First, there is a finite time delay between the generation of the stop signal at time B and the actual deceleration of the equipment at time C. During this time the uncoiler continues to unwrap at a rate determined by the velocity of the material. Second, when the equipment begins deceleration during the time interval C-D, the uncoiler continues to unwrap, and, since the deceleration is at a constant rate, the number of wraps unwound is a function of the square of the velocity of the material.

As shown in FIG. 5, the bridle speed 201 and uncoiler speed 202 have a point in common at time A. At this time, the velocities are equal and because the diameter of the bridle is known, the diameter of the coil may be calculated. Obviously, once the diameter of the coil is known, since the inside diameter of the coil is fixed by the diameter of the uncoiler mandrel the known thickness of one wrap of material makes possible a determination of the total number of wraps.

In accordance with the invention, the bridle and uncoiler speeds are measured, the known thickness of material is registered and used to calculate the number of wraps on the reel at a particular diameter, and calculations are automatically made to establish the number of wraps that will be uncoiled during stopping.

The number of wraps desired to be left on the reel at time D is preset into the equipment. Then the number of wraps that will be uncoiled during time intervals B-C and C-D, is calculated on the basis of the measured speed of uncoiling. The number of coils unwrapped during the time interval A-B is ascertained by subtracting the total number of wraps uncoiled during time interval B-E from the calculated number of wraps on the reel at time A. This yields a number which is equivalent to the number of wraps uncoiled form time A to time B. Thus, time B (the time for generation of the stop signal) is determined by counting the appropriate number of uncoiler revolutions from time A.

Returning to the block schematic in FIGS. 1 and 2, the first operation performed is the comparison of the velocity of the uncoiler 10 and the bridle 13 in order to determine time A on the speed curves shown in FIG. 5. After time A is determined, the number of wraps which must remain on the coil at time B is calculated in order to establish when the stop signal should be generated. Size Comparator 25 and Function Generator 26 respectively perform the required operations.

Throughout the following discussion, it is assumed that a predetermined number of wraps are desired to be left upon the uncoiler reel upon stopping. In actual operation it may be desired to have no wraps left upon the reel, or, it may be desired not to stop the equipment but rather to slow it down to a very slow rate from which it may be instantaneously stopped under the manual control of an operator. Either of these operations require completely automatic functioning of the control system up until time D. If manual operation is desired, the Size Comparator 25 generates a signal at time A and thereafter an operator takes over manual control of all succeeding operations.

Automatic operation is selected by closure of the "Auto" switch on the left of FIG. 1 and manual operation is selected by closure of the "Man" switch. The output of the digital tachometer associated with the active uncoiler is supplied to the control system via an uncoiler gate 17 in accordance with the closure of either a first uncoiler switch 1 UC or a second uncoiler switch 2 UC. Uncoiler gate 17 provides the output of the selected digital tachometer on lead 18.

Scanning FIGS. 1 and 2, the general functioning during a cycle of operations is apparent. The Size Comparator 25 operates in response to the speed signals from the uncoiler and bridle tachometers to detect when the uncoiler has been reduced to a particular diameter. Initially, the number of wraps remaining on the reel at that particular diameter is calculated and preset into the strip thickness register 47. Prior to detection of the particular diameter, the Accumulator Counter 46 is preset with the sum of three numbers: the number of wraps desired to be left on the reel when stopped; the number of wraps removed between the time the stop signal is generated and the drive begins to decelerate; and the number of wraps removed during deceleration. The number of wraps still to be removed from the reel after the particular diameter is detected and before the stop signal is generated is the difference between the number preset in strip thickness register 47 and the number preset in Accumulator Counter 46. Of course, for convenience and accuracy, multiples of these figures may be used. After the Size Comparator detects the particular diameter, the output of the uncoiler tachometer is applied to Accumulator Counter 46 as a counting pulse. When the total count registered in Accumulator Counter 46 is equal to that registered in strip thickness register 47, the stop signal is generated.

Considering the Size Comparator more closely, it comprises a Bridle Counter 20 and a Reel Counter 21. The two counters begin to count from 0 simultaneously and Bridle Counter 20 is adjusted to count to some fixed number, for example, 100. When the number 100 is registered in Bridle Counter 20, it is compared with the number registered in Reel Counter 21; the comparison circuit being represented by three AND gates 22, 23, and 24. The numbers registered in the counters at the end of any particular time period will be proportional to the speed of the bridle and uncoiler respectively. The registration of either of two numbers in the Reel Counter is of particular interest. The first number is chosen so that the coil size to which it corresponds is the preselected diameter containing the number of wraps that are preset in strip thickness register 47. The second number is chosen so that it will occur enough time before the first number to permit the calculations involved in generating the preset function which must be inserted into Accumulator Counter 46. After each counting interval (i.e., when the Bridle Counter reaches 100), if the second number has not been registered, the counters are reset via AND 24 and another count started. In response to the detection of the second number, a signal is generated at "NEC", which is applied via AND 22 and lead 30 to Function Generator 26 to initiate the generation of the required functions for presetting into Accumulator Counter 46. Upon detection of registration of the first number, a signal is generated at "EC" which is applied via AND 23 and lead 40 to directly control the initiation of either automatic control over stopping or signaling of the need for manual operation.

"NEC" is an acronym for near-equal-coincidence and "EC" is an acronym for equal-coincidence. Hereinafter, these terms are applied respectively to indicate the conditions of having almost attained the particular coil diameter for which the thickness register is preset, and of having attained that diameter. Although the description considers equal-coincidence to correspond to equal diameters (as manifested by equal speeds) on the Reel and Bridle, it is understood that any desired diameter may be used. Also, although a bridle speed is used for comparison purposes, other reference elements may be used, for example, an idler wheel.

When NEC is detected, the signal on lead 30 closes function generator switch 28 and the output of bridle tachometer 16 on lead 19 is gated through AND 31 into a Speed Counter 34 for a fixed interval of time; the time being governed by an interval timer 29 which blocks AND 31 after elapse of a fixed interval. The number registered in Speed Counter 34 is proportional to the material velocity. Upon the termination of the fixed interval, a reading complete switch 32 applies a signal to inhibit further bridle tachometer pulses from passing through AND 31. At this time, the nines complement of the number registered by the Speed Counter 34 is obtained by means of a speed complementing circuit 35. The nines complement is then registered in a speed complement counter 36. In addition to setting speed complement counter 36, the operation of reading complete switch 32 is effective via AND 37 to gate subsequent bridle tachometer pulses onto an output lead 43.

Interval timer 29 recycles and produces an output pulse at the end of each interval. These pulses are applied via AND 50 to increase the number registered in speed complement counter 36. When a number of timed intervals equal to the original speed count has elapsed, speed complement counter 36 is full and generates an output pulse on lead 42. The signal on lead 42 is used to stop subsequent bridle tachometer pulses from being passed by AND 37. In view of this arrangement, the number of pulses from the bridle tachometer that are passed to output lead 43 is equivalent to the square of the number stored in the Speed Counter 34; thus, the number of these pulses is commensurate with the amount of time required to decelerate from the operating speed to the desired slowdown or stop speed (point D in FIG. 5). Should the deceleration rate be changed, it is only necessary to change the length of the time in the interval timer 29.

Following the generation of this first series of pulses on lead 43, the bridle tachometer output is gated through AND 38 for a fixed interval of time under the control of gate generator 39. The number of pulses passed at this time is proportional to the speed and is consequently proportional to the period of time required between the generation of a stop signal (point B in FIG. 5) and the response of the equipment (point C in FIG. 5). The duration of the gate from gate generator 39 is determined by the response characteristics of the control apparatus.

The two pulse trains applied to output lead 43 are applied via OR 44 to the counting input of Accumulator Counter 46 to preset it. An additional preset from scrap preset 45 has previously preset Accumulator Counter 46 and thus the number initially stored therein is equal to the number of wraps that will be unwrapped from the uncoiler from the instant a stop signal is generated (point B in FIG. 5) until the operation is completed (point E in FIG. 5).

When EC is detected, a signal is generated on lead 40 which enables AND gate 49 to pass all succeeding pulses from the reel tachometer 15 which appear on lead 18. These pulses are divided in divider 51, to yield equal weighting of reel tachometer and bridle tachometer outputs if necessary, and applied via OR 44 to increase the count in Accumulator Counter 46. The actual count registered in Accumulator Counter 46 is compared in a coincidence circuit 48 with the number registered in thickness register 47. When coincidence occurs, the stop signal is generated.

In the case of automatic operation, when coincidence occurs, the signal on coincidence lead 70 is applied to shutdown control 65 to initiate deceleration and ultimately stopping or operation at a slow speed, in accordance with selected operation. The specific circuits for stopping or slowing are conventional and are not shown. While initiating deceleration, an automatic warning light 63 begins to flash and a warning horn 69 sounds. These conditions continue until the equipment is stopped. The circuitry for effecting such operation is shown in FIG. 2. Under automatic conditions, the "Auto" switch on the left of FIG. 1 is closed and consequently, an enabling input is presented to AND gates 58 and 59 and to flasher 60. Upon coincidence, the coincidence output via AND 58 energizes shutdown control 65, and the AND 59 is inhibited to prevent continuous energization of lamp 63 (as was previously the case). Flasher 60 is activated and through OR 61 causes flashing of automatic warning light 63. The output from AND 58 is also applied via an AND 66 to cause operation of warning horn 69. As long as the line is not stopped, the signal from AND 58 causes operation of horn 69 in a circuit including AND 66 and OR 67. Once the line is stopped, however, AND gate 66 is inhibited.

Under manual operation, the system merely gives a signal indication when EC (equal-coincidence) occurs in the Size Comparator. In response to this condition, an operator manually determines all further operation of the equipment. For manual operation, the "Man" switch on the left of FIG. 1 is closed and consequently, during operation and before coincidence, AND 52 is effective to provide an energizing signal for manual warning light 55 from the negative voltage source including: the "Man"

switch, AND 52, and OR 53. When EC is detected, the signal appearing on line 40 inhibits AND 52; however, the equal-coincidence signal is also applied to flasher 56. Flasher 56 provides intermittent voltage through OR 53 to cause flashing of manual warning light 55. An operator is thus summoned. In addition to the light flashing, AND 57 passes the output from flasher 56 via OR 67 to horn 69 causing it to operate. The horn continues operating until the stop push button is operated manually to inhibit AND 57.

Obviously, in both automatic and manual operation, any desired type of control and indication may be initiated in response to detection of the mentioned conditions.

With the general functioning of the invention in mind, a more complete understanding will be available from a consideration of a specific circuit designed to perform the described functions. Of course, the functions required by the various blocks shown in FIGS. 1 and 2 may be accomplished by circuitry developed in any number of ways by persons skilled in the art. The specific circuitry illustrated in FIGS. 6 through 16 and described hereinafter, is merely by way of example.

DETAILED DESCRIPTION

*Circuit Symbology*

In the circuit schematic, output and input signals are negative with respect to ground; therefore, any increase in voltage means that the voltage becomes less negative or approaches zero. The input and output signals are considered to be "on," designated by a "one" state, for voltages that are negative, and "off," designated by a "zero" state, for voltages substantially zero. Signals are considered to be the inverse of one another when one signal is "zero" and the other is "one" or vice versa.

In order to more succinctly set forth the circuit schematic in FIGS. 6 through 16, conventional symbols have been used to represent various logic and circuit functions. The symbols employed are set forth in FIGS. 4A through 4I. Any number of specific circuit configurations may be developed by those skilled in the art, to perform the functions designated by the various circuit symbols. The voltages supplied to operate the circuits are, of course, dependent upon the specific components employed; consequently, only the polarity of the voltage source is shown in the circuit schematic. In situations where it is desired to express a difference in magnitude between a first and a second voltage of the same polarity, a different number of polarity symbols are used. For example, (−) is less than (−−). These symbols do not convey the degree of the difference in magnitude, only the sense of the difference.

Figure 4:
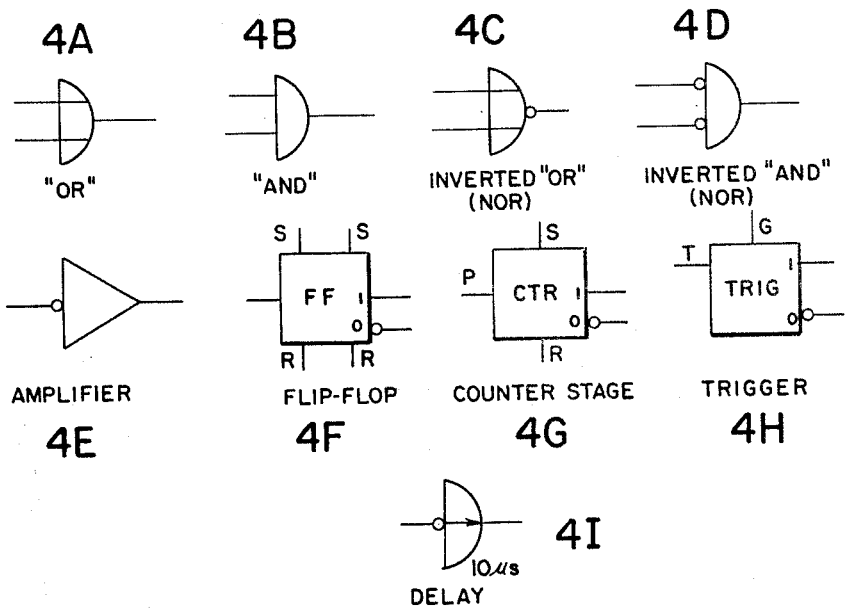
FIG. 4 illustrates typical symbols used hereinafter to represent known subcircuits.

Consider the four logic elements depicted in FIGS. 4A through 4D. The symbol in FIG. 4A represents the "OR" function. The OR circuit is arranged to provide an output signal when there is an input signal at either of the input terminals. Thus, if either the upper or the lower terminal has a "one" input there will be a "one" output. The inverted "OR" gate in FIG. 4C functions in a similar manner; however, in this case, the small circle at the output indicates inversion and consequently, when there is an input signal on either input terminal, there will be no signal on the output terminal.

FIG. 4B represents an "AND" function wherein the circuit is arranged to provide an output signal when there is an input signal at each input terminal. In other words, when both the inputs on the upper and the lower input terminals are "one" there will be a "one" output. The inverted "AND" element in FIG. 4D functions similarly; however, the inversion denoted by the small circle on each input lead indicates that when no signals are present on all terminals, there will be an output.

Although the inverted "OR" in FIG. 4C and the inverted "AND" in FIG. 4D are developed in different ways, it will be apparent that the functions they perform are identical. When neither the upper nor the lower input of either gate has a signal thereon, an output signal will appear. Thus, only if the upper and lower input terminals are "zero" will the output be "one." Because the function performed by each of these circuits is the same, in the following circuit description, both gates are referred to as "NOR" gates.

FIG. 4E is the symbol used for an amplifier. As indicated by the small circle on the input terminal of this amplifier symbol, the state of a signal transmitted through such an amplifier is inverted. If no small circle appears on the input terminal, the state of a signal transmitted through an amplifier is unchanged.

FIG. 4F illustrates a flip-flop. When a signal is applied to either of the set "S" terminals, the stage assumes a "one" state and an output signal appears at the "1" terminal. This signal is maintained after the set signal is removed until a second signal is applied at either of the reset "R" terminals. Under the influence of a reset signal, the stage assumes a "zero" state and an output signal appears at the "0" terminal which is maintained after the reset signal is removed until another set signal is applied. If both set and reset signals are simultaneously applied, the output signal is removed from both the "1" and the "0" terminals.

A counter stage is illustrated in FIG. 4G. This stage operates in a manner similar to the flip-flop, signals on the set "S" and reset "R" terminals being operative to produce an output signal on the "1" and "0" output terminals respectively. In addition, whenever a positive voltage transition is applied to the input terminal "P," the state of the counter is changed.

FIG. 4H illustrates the symbol used for a trigger source. In response to the application of a pulse on input terminal T, an output signal appears on output terminal "1." Under normal conditions, a signal output appears on output terminal "0" and this is modified only by the application of a signal to input terminal T. The presence of a signal on gate terminal "G" is effective to inhibit the effect of a signal on input terminal T and consequently, the trigger will retain its original state, i.e., no signal on output "1" and a signal on output "0."

FIG. 4I represents an inverting time delay circuit. The period of the time delay is indicated by a notation adjacent to the symbol. Application of a "one" to the input terminal causes a "zero" to appear at the output terminal immediately. Removal of the "one" from the input terminal is reflected after the cited delay by appearance of a "one" at the output terminal.

Figure 3:
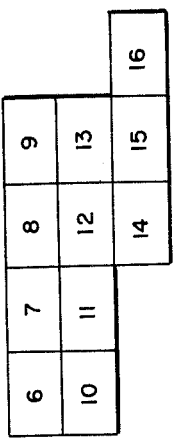
FIG. 3 is a sheet layout showing the proper orientation of sheets 6 through 16 to constitute a complete circuit schematic.

FIGS. 6 through 16, when positioned as shown by the sheet layout of FIG. 3, present a complete circuit schematic of the basic circuits employed in an illustrative embodiment of the invention. The various elements throughout the circuit bear descriptive notations having two distinct portions. A numerical prefix denotes the figure in which the element appears and an alphabetical suffix is generally descriptive of the function performed by the particular circuit element. For example, element 7 NEC appears in FIG. 7 and is the *near-equal-coincidence* flip-flop. The lead designations and logic elements also bear numerical prefixes indicative of the figure in which they originate; however, numerical suffixes are used to differentiate between the various elements in each figure.

The circuit operation described hereinafter is considered in the same chronological order as the sequence of events occur in actual operation. For convenience, this sequence of events is listed below and sub-titles precede each descriptive section.

(I) Start—all elements are reset and all preliminary information is preset in the appropriate registers;

(II) Size Comparator 25 functions—the Accumulator Counter 46 is loaded with the scrap preset;

(III) Near-equal-concidence detected—Function Generator 26 is enabled;

(IV) Function Generator operates—

(a) Speed count is taken from bridle tachometer, (b) After a fixed time interval, the nines complement of the speed count is loaded into the Speed Complement Counter 36 and the Accumulator Counter 46 begins counting bridle tachometer pulses, (c) The number in the Speed Complement Counter 36 is increased after each time interval by a count of one until full and the bridle tachometer pulses are blocked from the Accumulator Counter 46, (d) The bridle tachometer output is again gated into the Accumulator Counter 46 for a fixed interval of time, (e) The Accumulator Counter 46 registers all preliminary information;

(V) Equal-coincidence detected—reel tachometer pulses increase the number in the Accumulator Counter 46;

(VI) Accumulator Counter 46 increases count until a count is registered equal to the number registered in the Strip Thickness Register 47;

(VII) Stop signal generated—shutdown control is energized and warning circuits actuated;

(VIII) Line is restarted—entire sequence of events is repeated.

1. Start-Up

For each reel uncoiled, specific information is registered in the control system. This information includes: the strip thickness, the minimum coil desired, and the scrap preset desired. Also, because the use of two uncoilers is assumed, the one that is being used must be connected to the control system. The selection is depicted as controlled by switches 6 UC1 and 6 UC2 in the Uncoiler Selector. The effect of selecting one of these switches rather than another, is to connect the output of the digital tachometer associated with either the first or the second uncoiler to the control system.

Although the system is not limited to any material thickness, from a practical standpoint, a known plurality of gauges of material will be processed by the equipment. It is thus possible to precalculate the number of wraps left on the reel upon detection of equal-coincidence, for each gauge of material expected to be processed. These numbers are then stored and selected by the Thickness Register for each particular material processed. During operation, the number selected is compared with the numbers registered in the Accumulator Counter and upon coincidence, the stop signal is generated. The Thickness Register appears in FIG. 14 and comprises a plurality of push-buttons 14 GS0 through 14 GS9 for selecting progressively thicker material. A plurality of NOR gates and inverters is associated with the push-buttons for discretely representing the individual decimal digits of the number of wraps of material of the selected gauge on the reel when EC is detected. Thus, the outputs of the NOR gates and inverters enclosed by box 14–01 selectively indicate the least significant decimal digit in the number of wraps remaining for the selected gauge. The decimal number selected is indicated by the presence of a "one", or negative signal, on the lead associated with that number. Similar pluralities of gates 14–02, 14–03, and 14–04 selectively indicate the particular decimal digit required for successively more significant digits. In the embodiment, the least significant digit is a tens digit and consequently, the most significant digit shown is a ten thousands digit.

Figure 14:
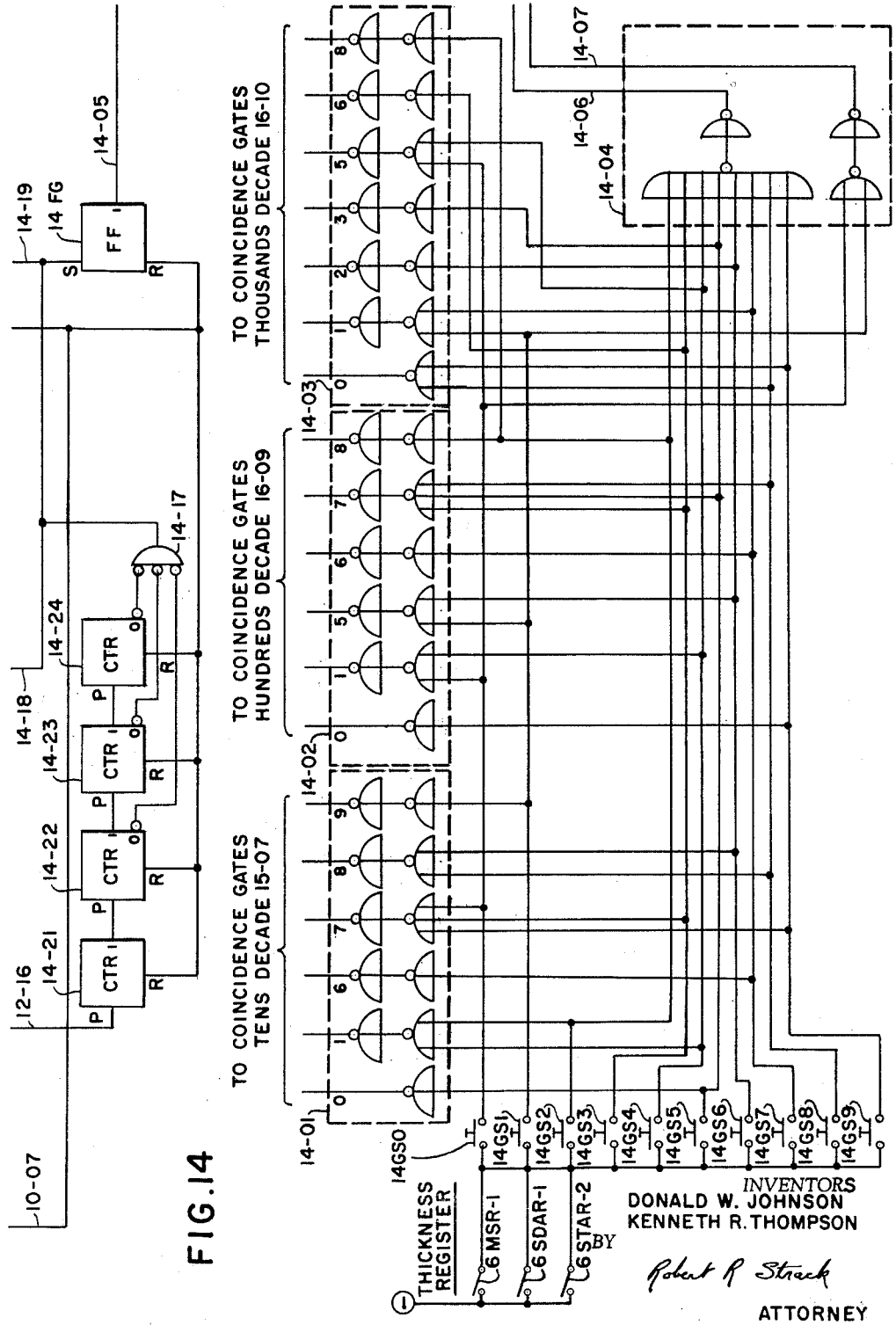

Because the Accumulator Counter is composed of binary-coded-decimal decades, the decimal representation appearing at the outputs of the encoding gates in FIG. 14 must be converted to a binary-coded-decimal form for comparison with the numbers registered in the Accumulator Counter. This conversion is made by additional logic gates interposed between the actual coincidence circuits and the encoding gates. The converting gates are illustrated as part of the coincidence gating circuits, as shown for example, for the tens decade in FIG. 15.

Here, NOR gates 15–22, 15–23, 15–24, 15–26, and 15–28, in conjunction with inverters 15–25 and 15–27 establish a permutation of states on output leads 15–61, 15–62, 15–64, and 15–68 corresponding to the binary-coded representation of the decimal number designated by the plurality of encoding gates 14–01 in FIG. 14.

The Thickness Register is set for each new material processed before operation commences; however, the information contained therein is not used until the Accumulator Counter reaches coincidence therewith and may be changed before NEC.

Figure 7:
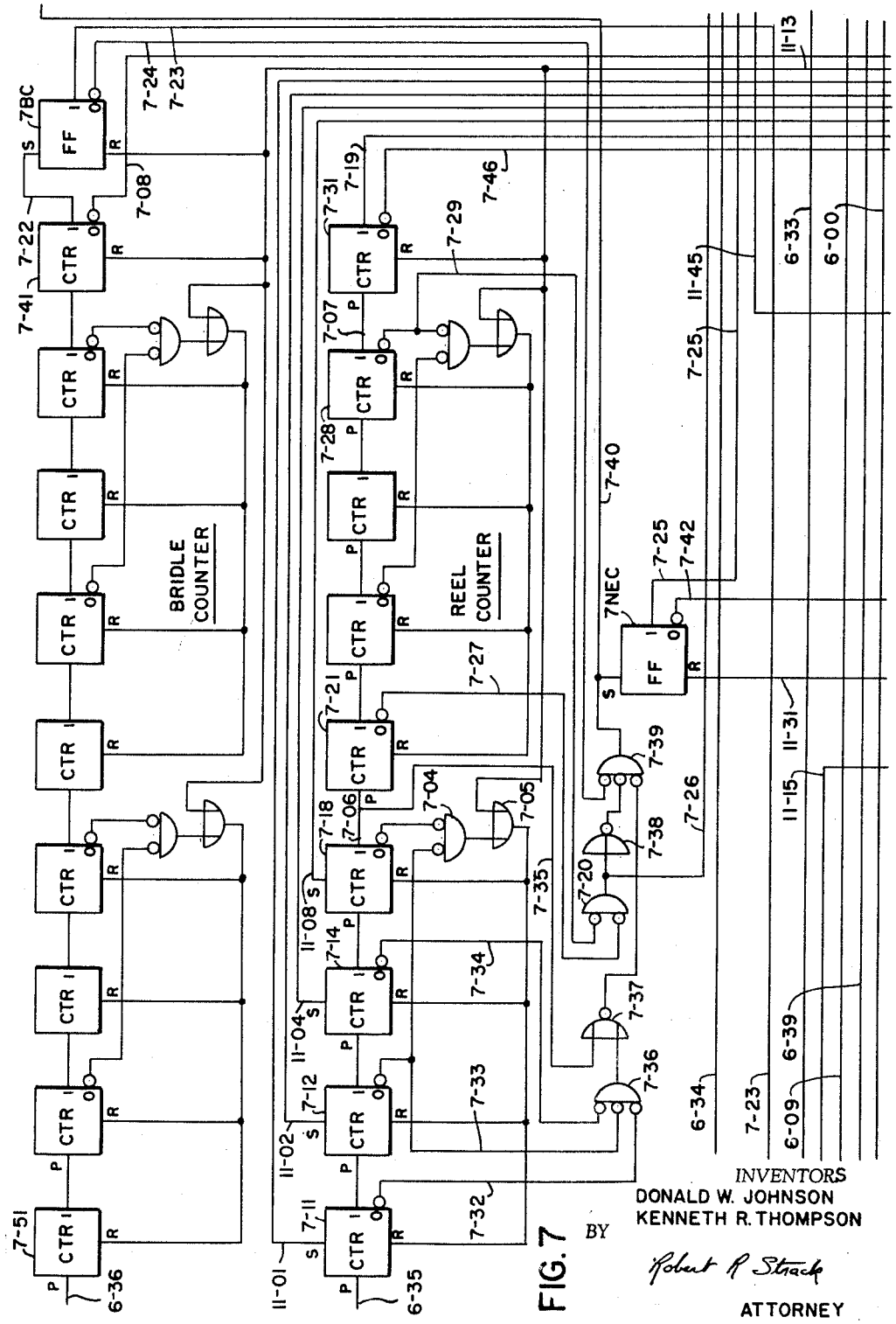
Figure 11:
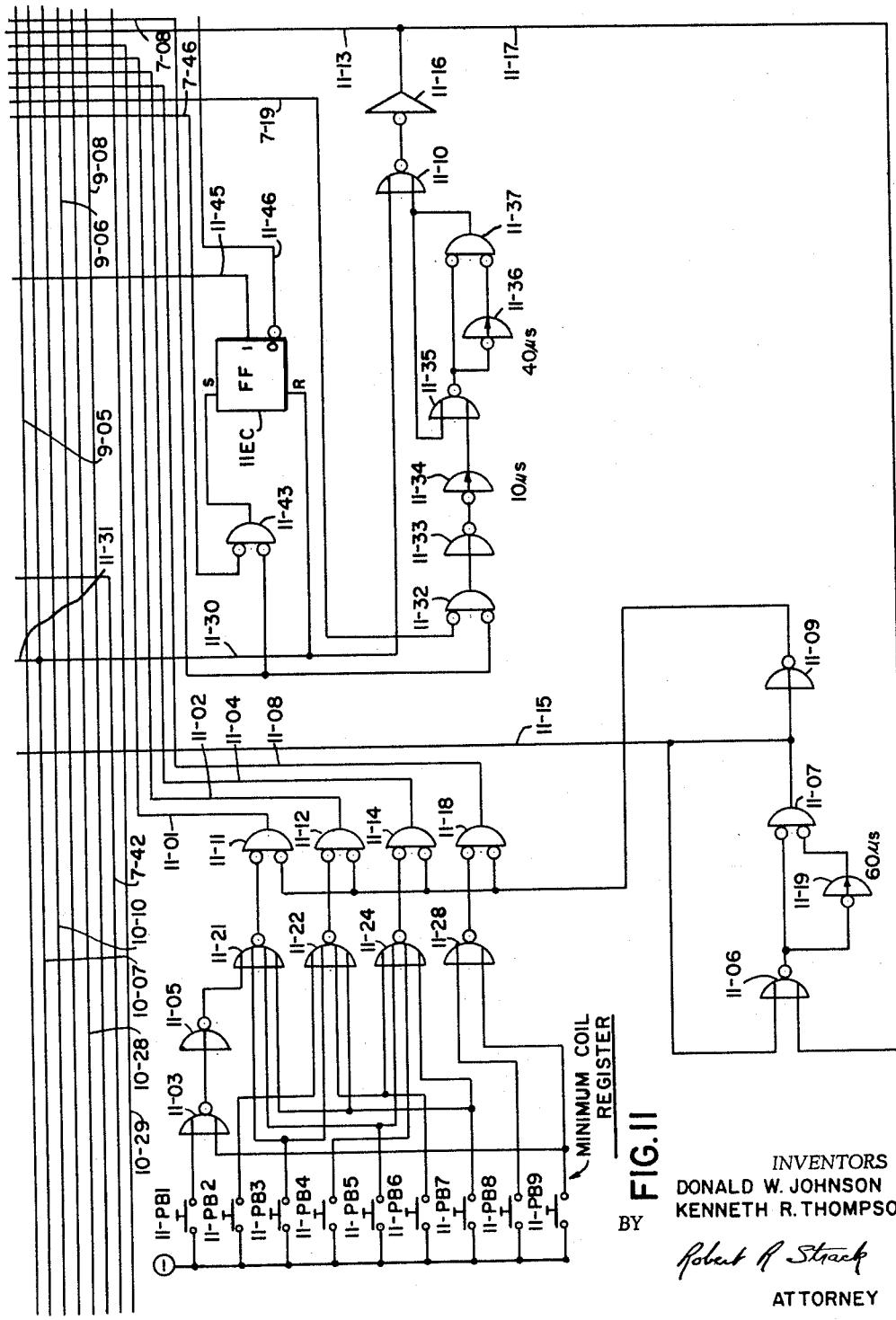
Figure 12:
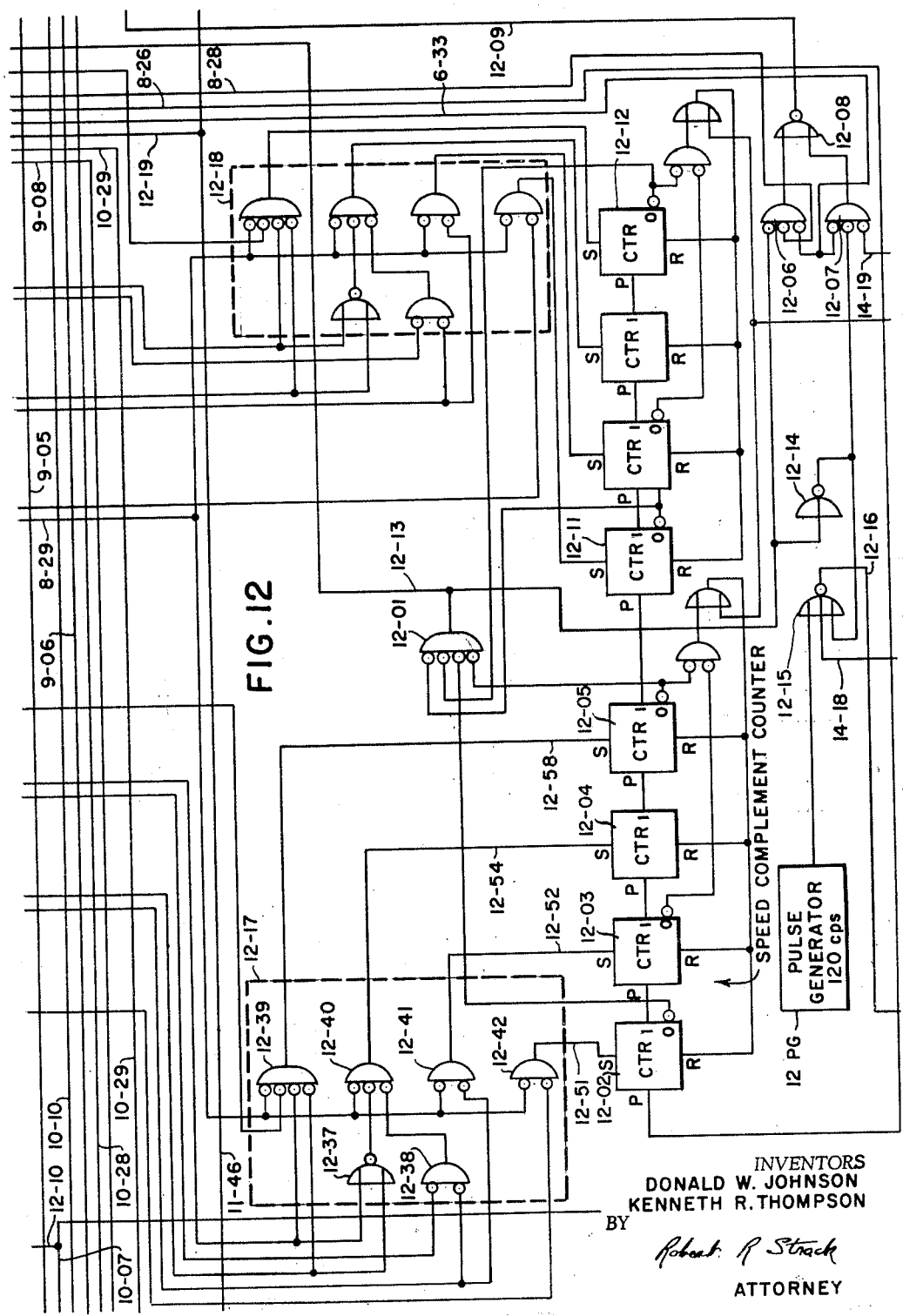
Figure 13:
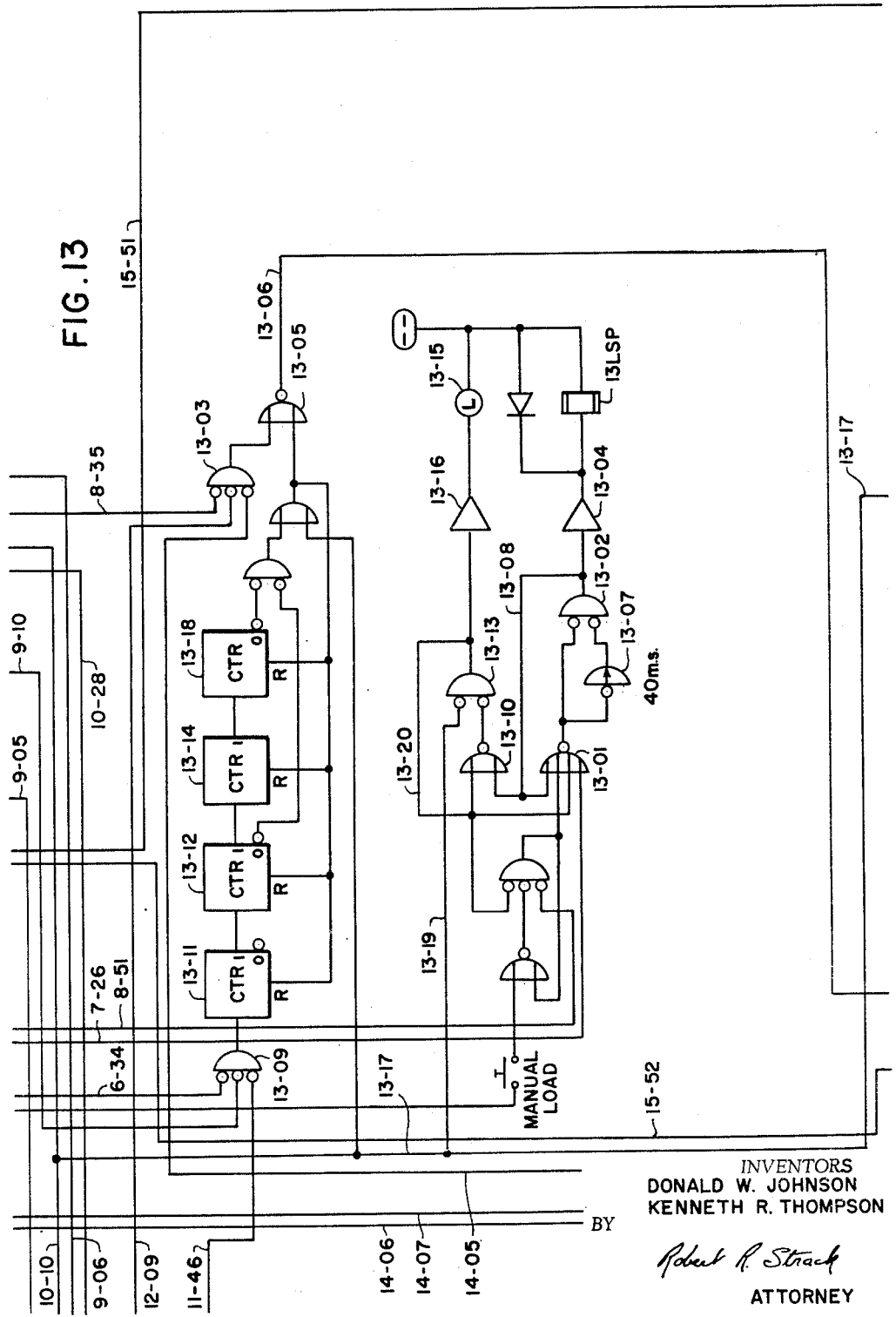

A minimum coil setting, which determines the length of strip left on the coil after stopping or slowing down, is set into the control system by means of the Minimum Coil Register shown in FIG. 11. In order to obtain the minimum coil value, the Reel Counter in FIG. 7 is preset with some figure greater than zero; thus, as counting subsequently proceeds, the number registered in the Reel Counter will always exceed the value generated in response to the reel tachometer output by the amount preset therein. Effectively, the control system interprets the reel speed as faster than it actually is, and as a result, the detection of NEC (near-equal-coincidence) and EC (equal-coincidence) occurs sooner than if there were no minimum coil setting.

Because the Reel Counter, as described hereinafter, is a binary-coded-decimal counter, the information set into the counter by the Minimum Coil Register must be in binary-coded-decimal form. The push-buttons illustrated in FIG. 11, i.e., 11 PB1–11 PB9, selectively apply a negative potential to a plurality of converting logic gates which are arranged to develop a permutation of signal conditions on leads 11–01, 11–02, 11–04, and 11–08 that represent, in binary-coded-decimal form, the decimal designations selected.

Figure 15:
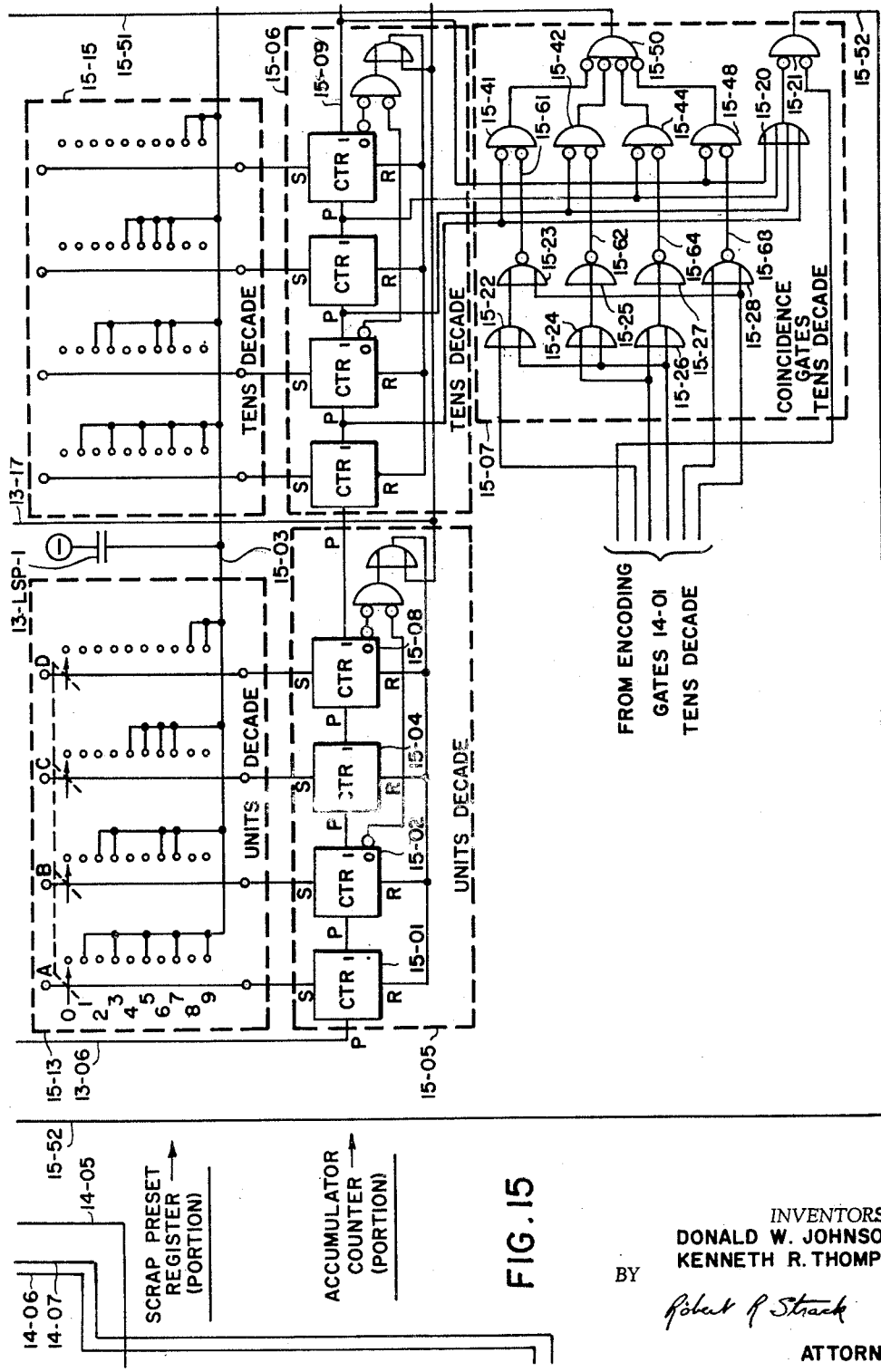
Figure 16:
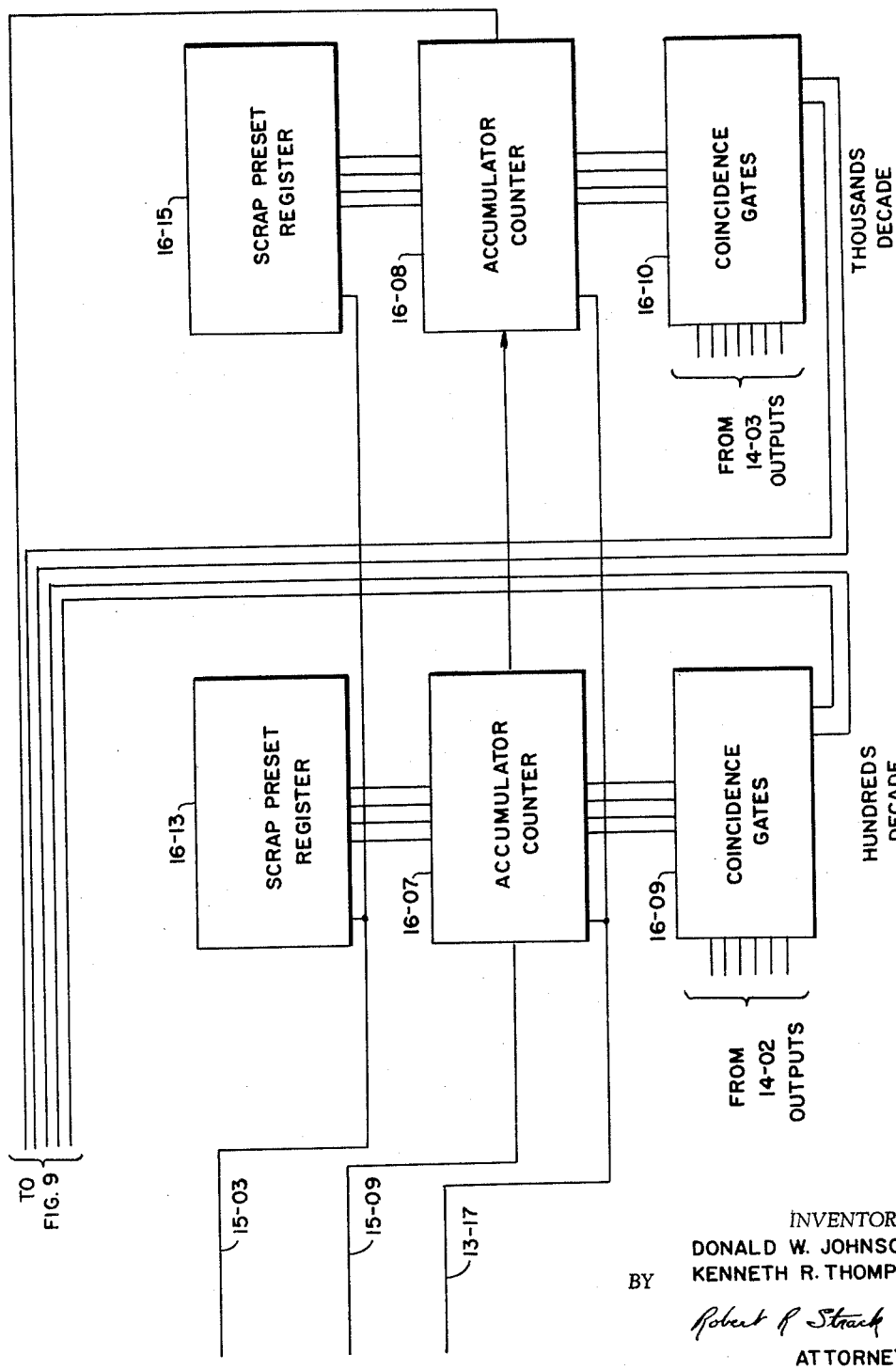

The scrap preset, or number of wraps desired to be left on the reel when it has come to a stop or slowdown condition, is set into the control system by the Scrap Preset Register appearing in FIGS. 15 and 16. Four switches are used to register the four decimal digits of numbers ranging from zero to 9,999. Each switch represents one digit and comprises four decks A, B, C, and D, with ten contacts, 0–9, on each deck. The contacts are connected to a negative supply via contacts 13–LSP–1 to yield a binary-coded-decimal permutation of signals on four output leads 15–31, 15–32, 15–34, 15–38, corresponding to the selected decimal number. Only the units and tens decade 15–13 and 15–15 of the Scrap Preset Register are shown in detail; however, the hundreds and thousands decades 16–13 and 16–15 are identical. At the appropriate time in the operating cycle, the negative voltage is applied via the scrap preset switches to the Accumulator Counter to register the scrap preset value therein.

Figure 6:
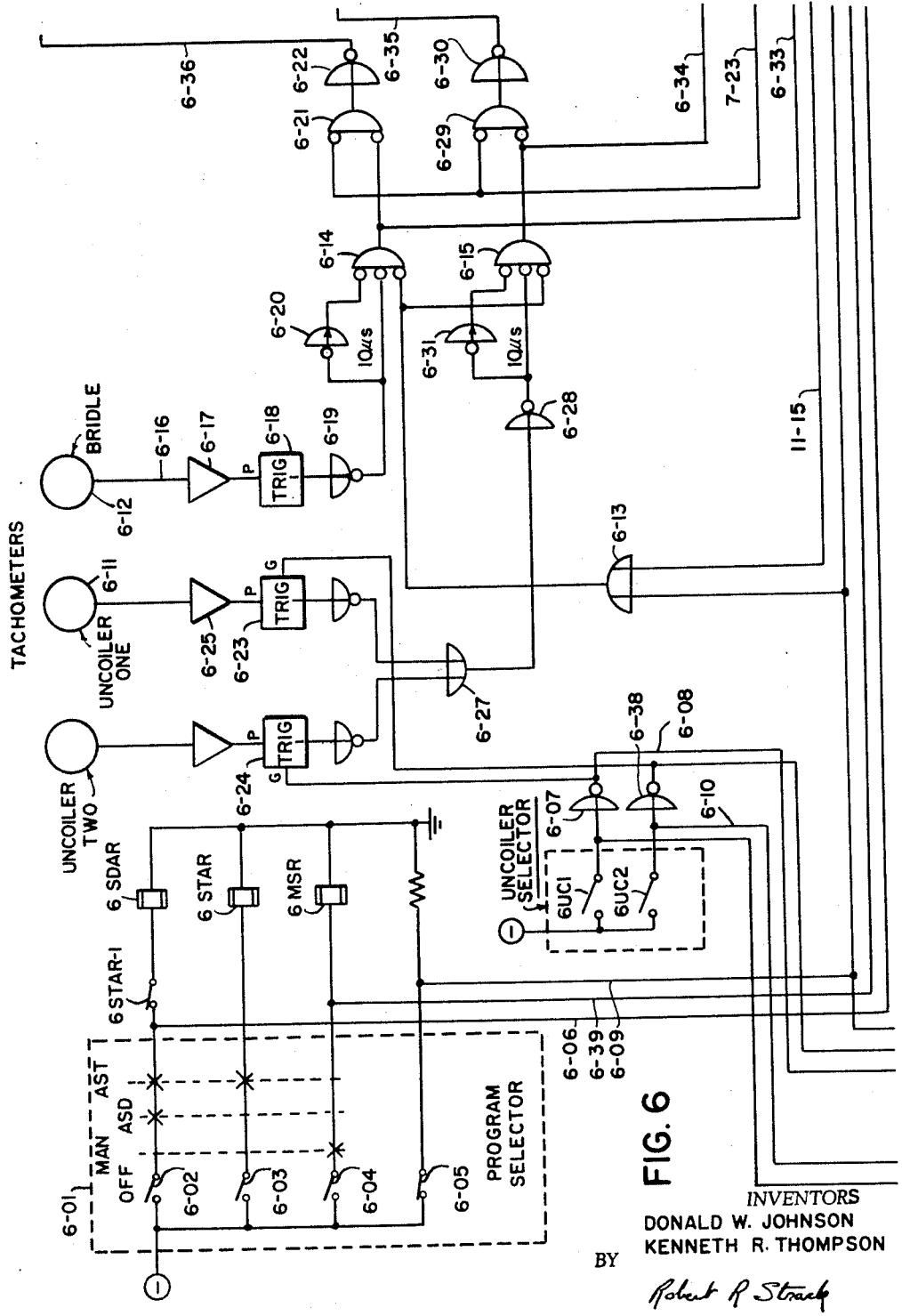
FIGS. 6 through 16 when taken together as shown in the sheet layout of FIG. 3 comprise a circuit schematic of an illustrative embodiment of the invention as it relates to uncoiling material from either a first or a second uncoiler.

When the required information is set into the system, it is started and the type of operation desired is selected in the Program Selector 6–01 appearing on the left of FIG. 6. Four modes of operations may be selected: "off"; "manual"; "automatic slowdown"; or "automatic stop." In manual operation, the control system generates a warning signal when equal-coincidence occurs and all subsequent controls are manual. In automatic slowdown or automatic stop operation, the control system automatically controls the process from beginning to end. The latter operations differ only in the particular equipment control mechanism controlled by the stop that is signal generated.

Four contacts appear in Program Selector 6–01. Symbolically, the contacts are depicted as a pair of short parallel lines perpendicular to the conductors they interconnect. When the contacts are normally-closed, a slanted line is drawn across the pair. Thus, contacts 6–02, 6–03, 6–04 are normally-open and contacts 6–05 are normally-closed. This represents the state of the contacts in the "off" condition.

When operating modes of operation are selected, if the contacts are closed, it is represented by means of an "X" placed on the conductor adjacent to the contact. During manual operation, contacts 6–04 are closed and contacts 6–02, 6–03, and 6–05 are open; during automatic slowdown operation, contacts 6–02 are closed and contacts 6–03, 6–04, and 6–05 are open; and during automatic stop operation, contacts 6–02 and 6–03 are closed and contacts 6–04 and 6–05 are open. The particular actuating means for the various contacts is irrelevant to the control system; but, for example, they may be manually actuated.

In response to program selection, control relays are energized, discrete indicating lamps are lit, and signals are produced for controlling equipment functions. Three relays have been illustrated in FIG. 6, a slowdown auto relay 6 SDAR, a stop auto relay 6 STAR, and a manual selected relay 6 MSR. As each operation is selected, the relay discretely identifying that operation is energized.

For purposes of description, it is assumed that automatic stop operation is desired and consequently, that the automtaic stop conditioning of the contacts in Program Selector 6–01 has been effected. Under these conditions, stop auto relay 6 STAR is energized and opens the energization circuit for slowdown auto relay 6 SDAR at normally closed contacts 6 STAR–1. Also, a negative potential is applied via contacts 6–02 over lead 6–06 to condition the control circuitry for appropriate stopping action and signal indications in response to the later detection of "near-equal-coincidence" and "equal-coincidence."

In connection with the application of negative voltages to condition various circuit elements, it should be understood that, unless otherwise specified, in the absence of such negative voltages, the elements are considered connected to a substantially zero voltage. The particular means of applying the normally zero conditioning is unimportant, but may take the form of a connection to ground via impedance means.

At this time, all counters in the control system are reset in preparation for the receipt of new data. The reset function is initiated upon either the original application of power to the control system or upon selection of a different uncoiler.

Figure 10:
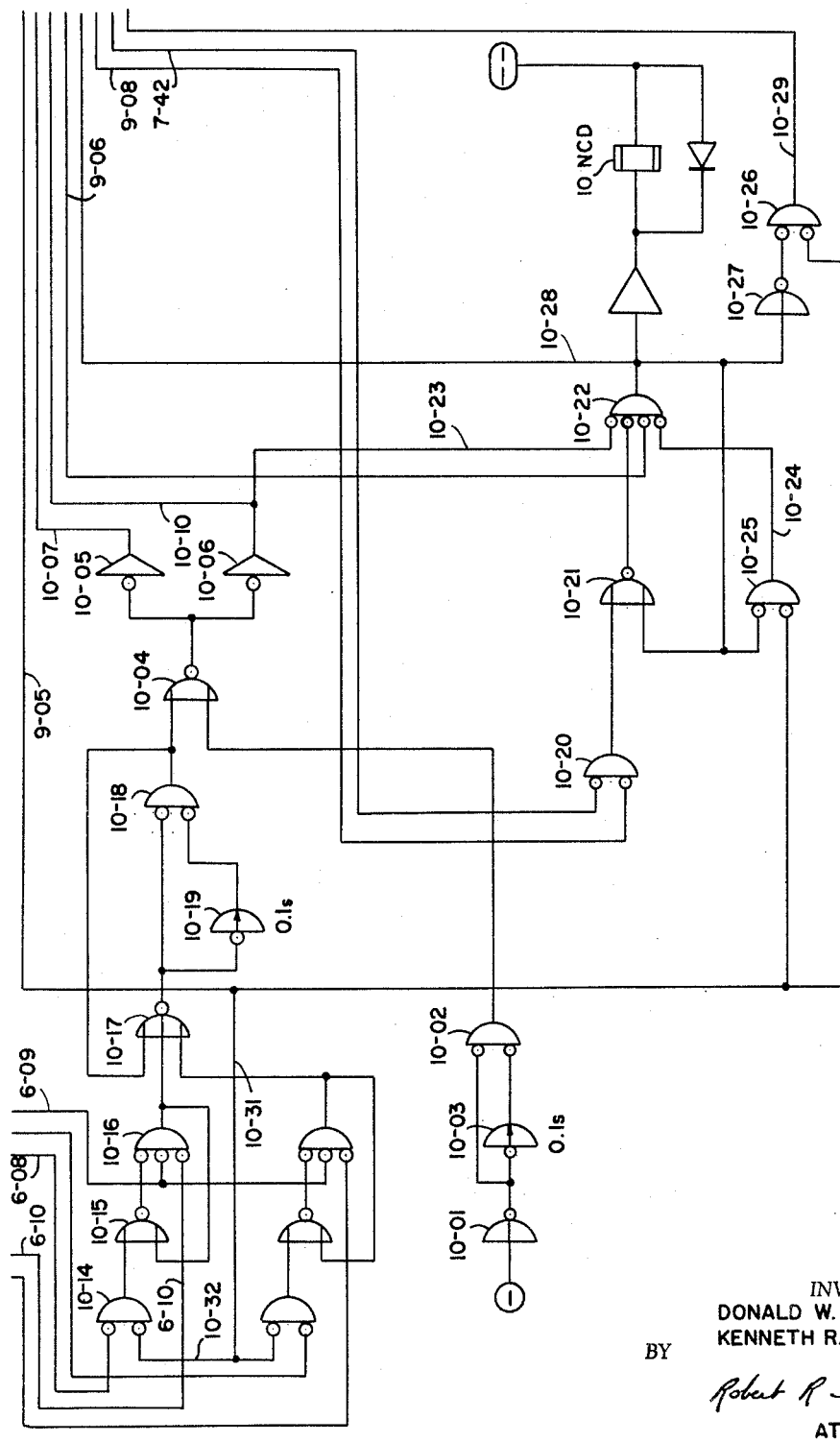

When power is initially applied, inverter 10–01 in FIG. 10 applies a zero input to one lead of NOR 10–02. The other input to NOR 10–02 is also supplied by inverter 10–01; however, a 0.1 second inverting timer 10–03 is interposed therebetween. The effect of inverting timer 10–03 is to initially provide a "zero" input to NOR 10–02 and subsequently, after the elapse of 0.1 second, to apply a "one" input thereto. These inputs generate a negative pulse at the output of NOR 10–02 having a duration of 0.1 second. This negative pulse, or temporary "one" state, is applied through NOR 10–04 to inverting amplifiers 10–05 and 10–06 which provide resetting signals for the control system.

If power was applied during a previous uncoiling operation, the reset signals are generated in response to the selection of an uncoiler. In this instance, a plurality of conditions must be met, namely: an uncoiler must be selected; the equipment must be running; and Program Selector 6–01 must be in a position other than "off."

The specific circuitry for generating reset signals during operation also appears in FIG. 10. NOR 10–14 is operative to produce a "one" output when both inputs are "zero." This condition exists when uncoiler 1 is selected and the equipment is running. The selection of uncoiler 1 by the closure of switch 6 UC1 produces a "zero" output on inverter 6–07 which is applied over lead 6–08 to one input of NOR 10–14. The condition that the equipment must be running is imposed by means of a pair of contacts which are automatically closed when the equipment is running. These contacts appear on the left to FIG. 9 and are identified as 9–03. The means by which the contacts are closed may be either mechanical or electrical. When the equipment is running, a negative potential is applied to inverter 9–04. This provides a "zero" signal on lead 9–05 which supplies the second input to NOR 10–14 via leads 10–31 and 10–32.

The "one" generated at the output of NOR 10–14 in response to the described inputs is inverted by NOR 10–15 and applied as an input to three-input NOR 10–16. The other two inputs to NOR 10–16 are from the Program Selector and Uncoiler Selector in FIG. 6. Specifically, the open condition of contacts 6–05 in the Program Selector zero conditions an input of NOR 10–16 via lead 6–09 and the open condition of switch 6 UC2 in the Uncoiler Selector zero conditions another input of NOR 10–16 via lead 6–10. Thus, by means of NOR gates 10–14, 10–15, and 10–16, the conditions of a first uncoiler selected, the equipment running, and the Program Selector being in a position other than "off," are imposed upon the reset signal generation circuit.

The "one" at the output of NOR 10–16 is used to generate a negative reset pulse by application through NOR 10–17 to NOR 10–18. A second input to NOR 10–18 is connected from NOR 10–17 via 0.1 second inverted timer 10–19. This circuit generates a 0.1 second negative pulse at the output of NOR 10–18 which is passed and inverted by NOR 10–04 and applied via inverting amplifiers 10–05 and 10–06 to reset the required elements of the control system.

The details of the distribution of the reset signal throughout the control system will not be described. The particular circuit connections are shown in the circuit schematic and the functioning of the various circuit components in response to application of the reset signal is apparent. However, as the description of circuit functioning proceeds, when appropriate, mention will be made of specific details of the resetting operation.

Immediately following reset of all the counters in the control circuit, the number registered in the Minimum Coil Register in FIG. 11 is transferred to the Reel Counter. Because the minimum coil number is selected in decimal form by choosing one push-button of the group consisting of 11 PB1 through 11 PB9, a plurality of NOR gates is used to convert the decimal form to the binary-coded-decimal form used by the Reel Counter. The NOR gates used are 11–03, 11–05, 11–21, 11–22, 11–24, and 11–28. These gates are selectively connected to a negative voltage source under the control of the 9 push-buttons of the Minimum Coil Register in order to produce a permutation of states at the output of the latter four gates that is the binary representation of the decimal selected by the push-button. The outputs from NOR gates 11–21, 11–22, 11–24, and 11–28 are directly applied to condition NOR gates 11–11, 11–12, 11–14, and 11–18. The latter gates are enabled to transfer the binary-coded-decimal number to the Reel Counter prior to each counting cycle.

The first reset signal occurs during "start-up" and consequently, the number in the Minimum Coil Register is first transferred to the Reel Counter in response to either the initial application of power, or the selection of one of the uncoilers. The reset signal appearing at the output of inverting amplifier 0–05 is applied over leads 10–07 and 11–30 to one of the inputs of NOR 11–10. The resulting "zero" from the output of NOR 11–10 is inverted by inverting amplifier 11–16 and applied via lead 11–17 and NOR 11–06 to one of the inputs of NOR 11–07. The other input of NOR 11–07 is connected to the output of NOR 11–06 by a 60 microsecond inverted timer 11–19. Therefore, the output of NOR 11–07 is in the form of a negative pulse of 60 microsecond duration. This negative pulse is applied via inverter 11–09 to an input of each of the NOR gates 11–11, 11–12, 11–14, and 11–18 enabling them to produce a discrete permutation of signals on the outputs thereof for setting the first decade of the Reel Counter.

In order to avoid simultaneously applying counting pulses from the digital tachometers and setting pulses from the Minimum Coil Register, the input from the digital tachometers is inhibited during the transfer of numbers from the Minimum Coil Register. The inhibiting circuitry is controlled by the same signal that enables the setting of the counter, namely, the negative pulse at the output of NOR 11–07. This pulse is applied via lead 11–15 and OR 6–13 to inputs of the NOR gates 6–14 and 6–15 which selectively pass the counting pulses from the reel and bridle tachometers. Thus, during setting of the Reel counter, the "one" on respective input terminals of NOR 6–14 and NOR 6–15 prevents the generation of output signals therefrom. The duration of the inhibiting signal is identical to the duration of the minimum coil setting signal, which has been established at 60 microseconds. Thereafter, the inhibiting pulse is removed and normal counting proceeds.

II. Size Comparator Functions

The function of the Size Comparator is to determine when the material on the uncoiler has been depleted to a particular diameter. The number of wraps of material remaining on the uncoiler at this particular diameter (or a multiple thereof) is the number set in the Thickness Register. The attainment of this particular diameter is detected by comparing the rotational velocity of the uncoiler with the rotational velocity of the bridle.

As previously mentioned, the actual comparison is made by counting the pulses from the bridge digital tachometer 6–12 until 100 counts have been registered. During the interval from zero to 100 pulses from the bridle tachometer, the pulses from the uncoiler tachometer 6–11 are also counted. The counting takes place in the Bridle and Reel Counters illustrated in FIG. 7. Each time 100 is registered in the Bridle Counter, comparison is made with the number registered in the Reel Counter in order to ascertain the relative velocity of the uncoiler. In the present embodiment, three relative velocities are of interest. The first of these occurs when the Reel Counter achieves a count of 90 in the counting interval required for the Bridle Counter to achieve 100. The second velocity occurs when the Reel Counter registers a count of 97 or 98 within the counting interval, and the third velocity occurs when the Reel Counter registers a count of 100 within the counting interval.

When the Reel Counter registers 90 (an arbitrary figure selected for convenience) within the period the Bridle Counter registers 100, the scrap preset is transferred to the Accumulator Counter. At some later time, shortly before the Reel Counter registers 100 within the time interval the Bridle Counter registers 100, the NEC signal is generated which intimates the operation of the Function Generator. Upon coincidence of registration in both counters, the EC signal is generated.

The Bridle Counter and the Reel Counter are both of the binary-coded-decimal form having a 1-2-4-8 pattern. Both counters consist of two full decades and one additional stage to register a complete count of 100. Of course, there is no restriction upon the type of counter used nor upon the numbering system in which the counting is performed. Binary-coded-decimal counting has been selected in the instant case for convenience and efficiency.

Because the counter decades are similar, it is only necessary to consider one decade to understand the functioning of an entire unit. This may best be effected by considering the first decade of the Reel Counter inasmuch as this decade, in addition to the simple counting process, includes the use of preset terminals in order to store the minimum coil setting previously discussed.

The first decade of the Reel Counter comprises four counter elements, 7–11, 7–12, 7–14, and 7–18. The "1" outputs of preceding elements are connected to the pulse inputs of their successors, and thus, switch their successors upon changing from a "one" to a "zero" state. Since the counting elements are essentially two-state devices, the use of four elements enables one to obtain sixteen discrete permutations of state. In order to restrict the discrete permutations to ten, NOR 7–04 and OR 7–05 are included. The inputs to NOR 7–04 are the "0" terminals of elements 7–12 and 7–18. When elements 7–12 and 7–18 both reside in a "one" state a "one" is present at the output of NOR 7–04. This "one" is transmitted through OR 7–05 as a reset pulse for the entire decade. The other input of OR 7–05 is connected to the general reset circuit which is energized during the reset operation hereinbefore discussed via leads 10–07 and 11–30. NOR 11–10, inverting amplifier 11–16, and lead 11–13.

Element 7–11 of the first decade in the Reel Counter receives counting pulses from the uncoiler in use. As each pulse is generated by a digital tachometer, the number registered in the first decade increases by one. Upon registering a count of ten (0101, in binary notation), the decade recycles and the consequent resetting of counter element 7–18 produces a positive transition on lead 7–06 which is applied as a counting pulse to the first counting element 7–21 of the second decade. A similar connection from the last counting element 7–28 of the second decade over lead 7–07 transmits a positive voltage transition as a counting pulse to the element 7–31 when the second decade recycles after reaching a count of ten. Thus, element 7–31 switches to a "one" state when a count of one hundred is registered.

The first decade of the Reel Counter is also subject to presetting in accordance with the minimum coil registration. This is accomplished by selectively applying negative signals to the set inputs of the elements in the decade which are to assume a "one" state. No ambiguity will occur if counting pulses and preset pulses are not applied simultaneously and this is avoided by the special gating previously described.

The Bridle Counter is substantially identical to the Reel Counter. A difference does exist in that upon the registration of 100 counts in the Bridle Counter, it automatically recycles both itself and the Reel Counter in order to begin a new comparison cycle. The recycling circuit comprises NOR 11–32, inverter 11–33, 10 microsecond inverting timer 11–34, NOR 11–35, NOR 11–37, NOR 11–10, and inverting amplifier 11–16. Whenever the Bridle Counter reaches 100 before the Reel Counter, leads 7–08 and 7–19, connected to the "0" and "1" outputs of elements 7–41 and 7–31 respectively, are conditioned to a "zero" state. This provides a proper complement of inputs for NOR 11–32 to generate a "one" at its output, which is applied through inverter 11–33 and inverting timer 11–34 to NOR 11–35. NOR 11–35 is interconnected with NOR 11–37 in conjunction with an inverting timer 11–36 in a manner similar to the pulse generators previously considered. This configuration generates a negative output pulse from NOR 11–37 having a time duration equal to the 40 microsecond time delay of inverting timer 11–36; the pulse being applied through NOR 11–10 and inverting amplifier 11–16 to reset all stages of both counters over lead 11–13. Recall that lead 11–13 is also energized during initial start-up by a reset pulse applied via leads 10–07 and 11–30, NOR 11–10, and amplifier 11–16.

Before proceeding further, an examination of the gating means interposed between the tachometers and the Reel and Bridle Counters is warranted. Upon energization of the control system, pulses are applied from bridle digital tachometer 6–12 to the counting input of the Bridle Counter, terminal P of stage 7–51. The circuitry between bridle digital tachometer 6–12 and the Bridle Counter comprises pulse amplifier 6–17, trigger 6–18, inverter 6–19, NOR 6–14, NOR 6–21, and inverter 6–22. Amplifier 6–17 and trigger 6–18 serve to reshape the pulse tachometer output. The pulse shaping circuit comprising inverter 6–19, NOR 6–14, and inverting timer 6–20 is similar to those previously considered and is adapted to generate a negative pulse at the output of NOR 6–14 having a duration of 10 microseconds. A further input to NOR 6–14 on lead 6–37 provides for inhibiting the bridle tachometer pulses when the Program Selector has the "off" condition selected or when the minimum coil setting is being registered in the Reel Counter.

The negative pulse generated at the output of NOR 6–14 is transmitted through NOR 6–21 and inverter 6–22 to terminal P of counting element 7–51 in the Bridle Counter. An additional input to NOR 6–21 is applied via lead 7–23 from the "1" output terminal of a flip-flop 7 BC associated with the one hundreds element 7–41 of the Bridle Counter. Flip-flop 7 BC is connected by lead 7–22 to counter stage 7–41 in such a way that its state is always identical to the counter stage and consequently, it provides outputs at its terminals "1" and "0" that are identical to the outputs appearing at the respective output terminals of the counter stage. The purpose of the input on NOR 6–21 from lead 7–23 is to prevent the application of bridle tachometer pulses to the Bridle Counter when the counter has reached a registration of 100 and is in the process of recycling.

The application of pulses from the uncoiler digital tachometers to the Reel Counter is accomplished in a manner similar to that just described. The primary distinction lies in the fact that pulses from either the first or second uncoiler are selected in accordance with the particular uncoiler being used. The selection of a first or second uncoiler tachometer output is made by the use of the gate terminals "G" on triggers 6–23 and 6–24. When a particular uncoiler is selected, the trigger associated with the particular uncoiler digital tachometer is enabled by conditioning its gate with a "zero." At the same time, the other trigger has a "one" state applied to its gate in order to inhibit its operation.

For example, consider the selection of uncoiler 1. Selector switch 6 UC1 is closed, applying a negative voltage through inverter 6–07 (therefore developing a "zero") to the gate of trigger 6–23 permitting it to function normally. Simultaneously, the gate of trigger 6–24 is negative, blocking triggering, due to the zero input on inverter 6–38. Only the pulses from the digital tachometer associated with uncoiler 1 are effective.

The circuit over which the output of digital tachometer 6–11 is applied to the Reel Counter comprises pulse amplifier 6–25, trigger 6–23, inverter 6–26, OR 6–27, inverter 6–28, NOR 6–15, NOR 6–29, and inverter 6–30. As in the case of the bridle digital tachometer circuit, means are provided, comprising the interconnection of inverter 6–28, NOR 6–15, and inverting timer 6–31, to generate a 10 microsecond negative pulse at the output of NOR 6–15. An additional input to NOR 6–15 insures the inhibition of reel counting whenever the Program Selector is "off" or the minimum coil setting is being registered in the Reel Counter. Also, reel counting is inhibited during recycling by the application of a negative signal over conductor 7–23 to NOR 6–29 during the recycling operation.

When the Reel Counter registers a count of 90 or greater, the scrap preset is loaded into the Accumulator Counter. The circuitry for accomplishing this includes: NOR 7–20, conductor 7–26, NOR 13–01, NOR 13–02, amplifier 13–04, and load scrap preset relay 13 LSP. The registration of 90 or greater in the Reel Counter manifests itself by the permutation of states, 1 0 0 1, in the second decade of the Reel Counter. This is detected by leads 7–27 and 7–29 connected respectively to the "0" outputs of elements 7–21 and 7–28 of the second decade. When the signals on these leads are both "zero," NOR 7–20 provides a "one" output which is applied via conductor 7–26 to NOR 13–01 in FIG. 13. In response to this signal, NOR 13–01 yields a "zero" which is applied to the pulse generating circuit comprising NOR 13–02 and inverting timer 13–07. A negative pulse of 40 millisecond duration is generated at the output of NOR 13–02 which is effective via amplifier 13–04 to energize load scrap preset relay 13 LSP. The negative pulse is also applied in a feedback circuit over lead 13–08 to the input of NOR 13–01 in order to insure a complete 40 millisecond duration even if the Reel Counter recycles before elapse of this time period. Energization of relay 13 LSP closes contacts 13 LSP–1 in FIG. 15 and applies a negative potential to enable the transfer of information from the Scrap Preset Register to the Accumulator Counter.

Because each of the Scrap Preset Register decades is identical, only two, 15–13 and 15–15, have been shown in detail in FIG. 15. As noted previously, the contacts on each deck are wired to a negative voltage source through normally-open contacts 13 LSP–1 to produce the appropriate permutation of signals on the output leads 15–31, 15–32, 15–34, and 15–38 for the binary-coded representation of the decimal digit designated by the selected contacts.

For example, assume the units digits 7 is selected. Under these conditions, a negative potential is applied via contacts 13 LSP–1 and conductor 15–03 to leads 15–31, 15–32, and 15–34. Lead 15–38 is not connected to the negative potential and consequently, in accordance with the earlier assumption, a ground potential appears thereon. In other words, the cited leads are conditioned with the permutation 1 1 1 0 which is the binary representation of the decimal digit 7.

Leads 15–31, 15–32, 15–34, and 15–38 are directly connected to the set terminals of counting elements 15–01, 15–02, 15–04, and 15–08 respectively, in the Accumulator Counter units decade 15–05. Consequently, the energization of these leads selectively conditions the Accumulator Counter units decade to register the number preset in the Scrap Preset Register units decade. Similar circuitry and connections are employed for each decade of the Scrap Preset Register and the Accumulator Counter. Thus, in response to the registration of the number 90 in the Reel Counter, all of the preset scrap information is loaded into the Accumulator Counter.

The loading operation takes place within the 40 milliseconds during which the load scrap preset relay 13 LSP is operated. Upon termination of this interval, the output of NOR 13–02 returns to a "zero" condition. This "zero" is applied via NOR 13–10 and NOR 13–13 to energize a scrap preset loaded indicating lamp 13–15. An additional input to NOR 13–13 from the reset circuit provides for extinguishing the scrap preset loaded lamp at the termination of operations. This input includes leads 10–10, 13–17, and 13–19. During operation, a self-locking circuit is created by connecting the output of NOR 13–13 to the input of NOR 13–10 via conductor 13–20.

While the scrap preset is loaded into the Accumulator Counter, the Size Comparator continues to search for near-equal-coincidence. The Bridle and Reel Counters in FIG. 7 compare and recycle without affecting the rest of the control system until near-equal-coincidence is detected.

*III. Size Comparator Detects Near-Equal-Coincidence*

When the Reel Counter registers a count of 97 or 98 during the interval that the Bridle Counter registers a count of 100, the NEC signal is generated. In response to this signal, the Function Generator is activated to produce a plurality of pulses that is equal to, or a multiple of, the number of revolutions of the Reel Counter required to deplete its contents to the scrap preset level. Also, a circuit is enabled which will insure the generation of warning signals in the event the system is manually stopped before equal-coincidence occurs. This latter operation protects against any data that has been accumulated and processed being destroyed and causing the control to process bad or incorrect data. In effect, the control warns that it cannot reliably perform automatically and an operator must intervene.

The registration of 97 or 98 in the Reel Counter is detected by NOR gates 7–36 and 7–37. NOR 7–36 produces a "one" output when the first three counter elements 7–11, 7–12, and 7–14 reside in a "one" state. This is accomplished by connecting the "0" terminals of the respective counter elements to NOR 7–36 by conductors 7–32, 7–33, and 7–34. The output of NOR 7–36 supplies an input to NOR 7–37 and consequently, produces a "zero" output therefrom which is discretely indicative of the presence of a 7 in the units decade. A second input to NOR 7–37 is supplied from the "1" output of counter element 7–18 via conductors 7–06 and 7–35. This input will register a "one" when the counter element 7–18 is in a "one" state and detects the registration of the number 8. Thus, NOR 7–37 yields a "zero" output when either a 7 or 8 is registered in the first decade of the Reel Counter.

The registration of a 9 in the second decade of the Reel Counter is detected by NOR 7–20. The inputs of NOR 7–20 are connected via leads 7–27 and 7–29 to the "0" outputs of counter elements 7–21 and 7–23 respectively. Whenever the first and last counter elements of the second decade register a "one" state, i.e., when a 9 is registered, "zeros" are presented to NOR 7–20 and a "one" signal is produced at the output thereof on conductor 7–26. It will be recalled that this "one" conditioning of lead 7–26 was previously used to initiate the loading of scrap preset information into the Accumulator Counter.

An inverter 7–38 applies the output of NOR 7–20 to one of the inputs of NOR 7–39. Other inputs to this latter NOR gate include the output of NOR 7–37 and the signal on the "0" output of Bridle Counter flip-flop 7 BC. This input configuration assures the generation of a "one" output from NOR 7–39 when a 97 or 98 is registered in the Reel Counter and a 100 is registered in the Bridle Counter. The resultant "one" condition on lead 7–40 is referred to as the NEC or near-equal-coincidence signal. This signal is applied to set near-equal-coincidence flip-flop 7 NEC to a "one" state and to set the generate function flip-flop 8 GF to a "one" state, the latter conditioning being effective to initiate the generation of the required function.

Figure 9:
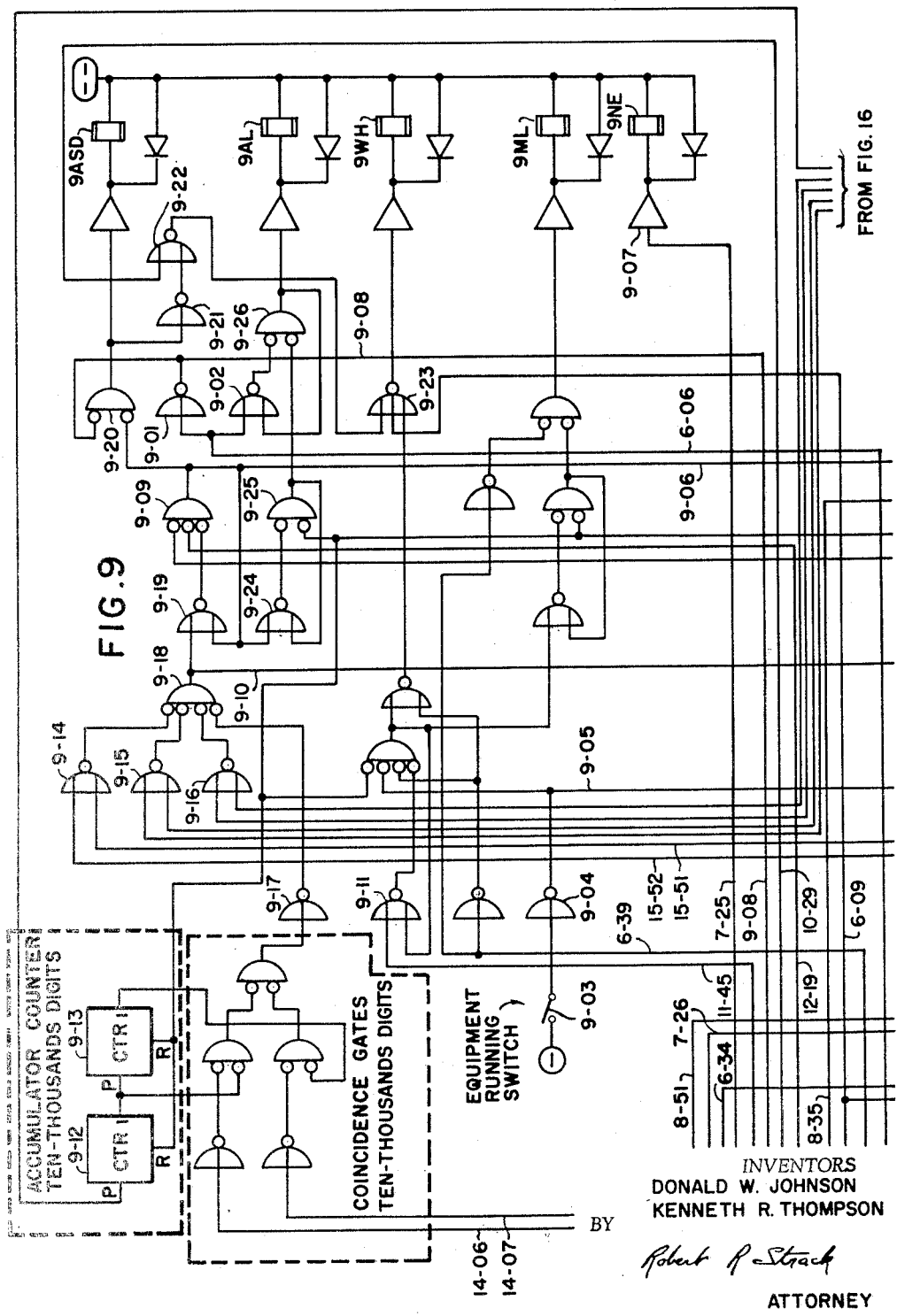

A discrete indication of the attainment of near-equal-coincidence is produced by the operation of near-equal-coincidence relay 9 NE in FIG. 9. This relay is energized in response to a signal on the "1" output of near-equal-coincidence flip-flop 7 NEC. The energization circuit includes the "1" output of flip-flop 7 NEC, conductor 7–25, amplifier 9–07, near-equal-coincidence relay 9 NE, and a (— —) supply.

In addition to initiating the generation of function information, the registration of near-equal-coincidence protects against ambiguous operation which may arise if manual stopping of the equipment is initiated before equal-coincidence occurs. The "0" output of relay 7 NEC is connected via lead 7–42 to an input of NOR 10–20. A second input to NOR 10–20 is applied from the output of NOR 9–01 over conductor 9–08. When automatic operation is selected, the output of NOR 9–01 is "zero" and consequently, NOR 10–20 produces a "one" when near-equal-coincidence is registered. This "one" is applied via NOR 10–21 to zero condition one of the inputs of NOR 10–22. The other inputs of NOR 10–22 include: lead 10–23 connected to reset amplifier 10–06; lead 9–06 connected to the output of a NOR 9–09 which yields a discrete "one" indication upon equal-coincidence; and lead 10–24 connected to the output of a NOR 10–25 which yields a "one" indication when the equipment is running. Under normal conditions, NOR 10–22 supplies a "zero" output; however, in the event of temporary shutdown before equal-coincidence is detected, upon re-energization the output of NOR 10–22 will be a "one." Such conditions will be considered later.

While the initiation of function generation and enabling of the protection circuit is taking place, the Size Comparator continues to cycle seeking equal-coincidence. During the interval of time from the detection of near-equal-coincidence to detection of equal-coincidence, the Function Generator operates to develop the required information for storage in the Accumulator Counter.

*IV. Function Generator Operates*

Figure 8:
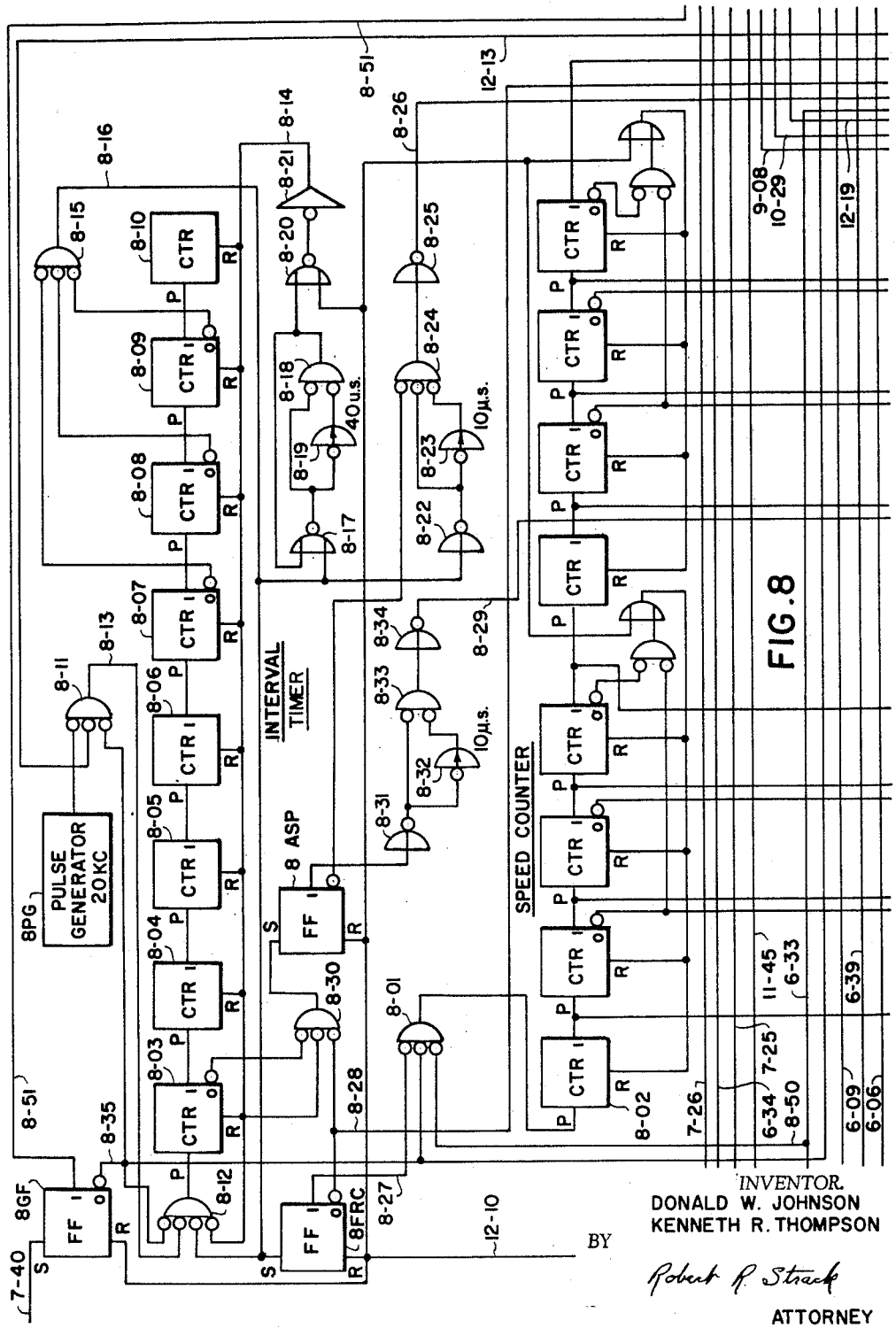

(a) The first function generated is commensurate with the number of wraps uncoiled from the reel during the deceleration of the equipment from its normal speed to the slowdown or stop condition commanded. As explained hereinbefore, this number is a function of the square of the speed of material. The first step in generation of this number is the development of a number that is commensurate with the actual speed. This is accomplished by counting the output of the bridle tachometer over a fixed interval of time and considering the total number counted with respect to the actual period of time the counting required. When the generate function flip-flop 8 GF is conditioned in response to the detection of near-equal-coincidence, the Interval Timer and 18 disposed across the upper portion of FIG. 8 is activated and the Speed Counter disposed across the lower portion of FIG. 8 begins counting up pulses from the bridle tachometer.

The Speed Counter comprises two decades, each containing four counter elements connected in a 1-2-4-8 binary-coded counting configuration similar to that used in the Bridle and Reel Counters. As illustrated, the left decade registers the units digits and the right decade registers the tens digits of a count. The bridle tachometer generated at the output of NOR 6–14 are applied over leads 6–33 and 8–50 to NOR 8–01, which in turn applies counting pulses to the pulse input of the first counting element 8–02 of the Speed Counter. NOR 8–01 has three inputs: the first provides the bridle pulse tachometer signals; the second provides an enabling signal from the generate function flip-flop 8 GF "0" output terminal; and the third provides an enabling signal from the first reading complete flip-flop, 8 FRC, "1" output which permits counting only during the first time interval. As the operation proceeds, the pulses from the bridle tachometer successively increase the number registered in the Speed Counter. This counting continues until the elapse of the aforementioned predetermined time interval.

The predetermined time interval is developed by the straight binary Interval Timer. This counter contains elements 8–03 through 8–10 having the "1" outputs of preceding counter elements connected to the pulse inputs of succeeding elements. The input to the first counter element 8–03 is supplied by a pulse generator 8 PG operating at a known frequency, for example, 20 kilocycles.

The output from pulse generator 8 PG is applied through NOR 8–11 and NOR 8–12 to the pulse terminal of the first counter stage 8–03. NOR 8–11 has additional inputs from the "0" output of generate function flip-flop 8 GF, and from the speed complement counter NOR gate 12–01. These additional inputs insure a "one" output from NOR 8–11 during the absence of pulses from pulse generator 8 PG. As each negative pulse is generated by the pulse generator, a negative pulse output, or "one" conditioning, occurs at the output of NOR 8–11 and is applied over lead 8–13 to one of the inputs of NOR 8–12. The other inputs to NOR 8–12 include an enabling signal from the "0" output of generate function flip-flop 8 GF; a possible reset signal on conductor 8–14; and a signal from a NOR 8–15 on lead 8–16, indicative of whether or not the Interval Timer has reached its predetermined setting and completed a counting interval.

Thus, the pulses from pulse generator 8 PG increase the number registered in the Interval Timer as long as the following conditions exist: a "one" state in the generate flip-flop 8 GF; the Speed Complement Counter is not full; the reset signal is not being applied; and a predetermined count has not been attained.

NOR 8–15 has three inputs connected respectively to the "0" output terminals of counter elements 8–07, 8–08, and 8–09. With these counter stages register a "one"

state, the counting interval is complete. NOR 8-15 produces a "one" which is applied over lead 8-16 to inhibit further counting and initiate recycling of the Interval Timer. Since the counting interval is a function of the decelerating rate, it may be changed for different rates. The "one" output from NOR 8-15 is also applied to generate a counting pulse input for the Speed Complement Counter and thus develop a number therein which is equivalent to the square of the speed. This is described later.

A negative 40 microsecond reset pulse is generated by the pulse generating circuit comprising NOR 8-17, inverting timer 8-19, and NOR 8-18 connected in the fashion previously described. This negative reset pulse is applied via NOR 8-20, pulse amplifier 8-21, and lead 8-14 to the reset terminals of all counter stages in the Interval Timer. It should be noted that the Interval Timer is also resettable at the commencement of operation in response to a reset signal from amplifier 10-05 via leads 10-07 and 12-10.

(b) After elapse of the first time interval the Speed Counter registers a number commensurate with the velocity of the material. The complement of the number registered in the Speed Counter is generated by a plurality of NOR gates 12-17 and 12-18 associated with each decade thereof. Because the complementing circuits are identical, only those gates associated with the units decade of the Speed Counter will be considered. These are enclosed by dashed lines 12-17.

NOR gates 12-37 through 12-42 are selectively connected to the outputs of the counter elements of the units decade to condition leads 12-51, 12-52, 12-54, and 12-58 for generation of a permutation of signals that is the nines complement of the number registered in the first decade. These leads are connected to the set inputs of the counter elements 12-02, 12-03, 12-04, and 12-05 respectively in the first decade of the Speed Complement Counter. When the complementing gates are enabled at the end of the first time interval, the complement of the number registered in the Speed Counter is transferred to the Speed Complement Counter.

For example, consider the registration of the decimal number 7 in the Speed Counter. This manifests itself as a conditioning of states from left to right in the first decade of the Speed Counter of, 1 1 1 0. The appropriate "1" and "0" outputs of each stage of the first decade of the Speed Counter are connected through the plurality of NOR gates 12-17 associated therewith in a fashion to produce a conditioning on the output leads 12-51, 12-52, 12-54, and 12-58 of 0 1 0 0 respectively. This is the binary representation of decimal number 2, which is the nines complement of decimal number 7. The tens decade of the Speed Counter is similarly connected via complementing gates 12-18 to the tens decade of the Speed Complement Counter.

The complementing gates 12-17 and 12-18 are enabled upon termination of the first counting interval in accordance with the following circuit operations. Completion of the interval count generates a "one" at the output of NOR 8-15 that sets first reading complete flip-flop 8 FRC. When set, the "zero" on the "0" terminal of flip-flop 8 FRC is applied via NOR 8-30 to set the accumulate square permissive flip-flop 6 ASP to a one state. In response to assuming a one state, flip-flop 8 ASP initiates the generation of a 10 microsecond negative pulse at the output of NOR 8-33 which is inverted by inverter 8-34 and applied as an enabling pulse via lead 8-29 to the complementing circuitry associated with each decade of the Speed Counter. The negative pulse is generated in the circuit comprising inverter 8-31, inverting timer 8-32, and NOR 8-33 in the fashion previously described for similar circuit configurations.

After the first counting interval, the Speed Counter ceases to operate and all subsequent bridle tachometer pulses are applied to the Accumulator Counter until the Speed Complement Counter is full. The switching of first-reading-complete flip-flop 8 FRC inhibits further bridle tachometer pulses from being counted in the Speed Counter by disabling NOR 8-01 with a "one" signal on lead 8-27. At the same time, the "zero" state on output terminal "0" of flip-flop 8 FRC is applied via conductor 8-28 to enable NOR 12-06 to pass bridle tachometer pulses to the Accumulator Counter. With NOR 12-06 enabled, the bridle tachometer pulses are applied from the ouptut of NOR 6-14 to the Accumulator Counter in the circuit comprising conductor 6-33, NOR 12-06, NOR 12-08, conductor 12-09, NOR 13-03, NOR 13-05, and conductor 13-06.

It will be recalled that before application of these pulses the Accumulator Counter is preset with a number representative of the scrap preset. Consequently, counting commences from this preset value. The counting pulses are applied to the pulse input of the first counter element 15-01 of the Accumulator Counter units decade.

The NOR gates interposed between the bridle pulse tachometer and the counting input of the Accumulator Counter are employed to control the counting interval and to insure that a plurality of conditions exist before counting proceeds. NOR 12-06 has inputs from NOR 12-01 which stops counting when the Speed Complement Counter is full. NOR 13-03 has a first input which inhibits application of the bridle tachometer pulses when the generate function flip-flop 8 GF is in a "zero" state and also a second input over conductor 14-05 from function generated flip-flop 14 FG prevents application of bridle tachometer pulses when the function has been generated.

(c) The Interval Timer counts continuously in response to pulses from pulse generator 8 PG and at the end of each time interval generates a signal at the output of NOR 8-15 which causes resetting of the counter and generates a counting pulse for the Speed Complement Counter. This speed complement counting pulse is generated by means of inverter 8-22, inverting timer 8-23, and NOR 8-24 connected in a configuration similar to that previously described. The output of NOR 8-24 is applied to the first counter stage 12-02 of the Speed Complement Counter via inverter 8-25 and conductor 8-26.

The Speed Complement Counter increases by one number for each completed timing interval. When the Speed Complement Counter has reached a full count of 99, a time duration commensurate with the square of the speed has been generated and, therefore, the bridle tachometer pulses are prevented from further application to the Accumulator Counter. NOR 12-01 is connected to appropriate stages of the first and second decade of the Speed Complement Counter to produce a "one" output when 99 is registered therein. Specifically, the inputs of NOR 12-01 are connected to the "1" outputs of counter stages 12-02, 12-05, 12-11, and 12-12. The signal from NOR 12-01 is applied to NOR 12-06 in order to block further bridle tachometer pulses from the Accumulator Counter. It is also applied over lead 12-13 to NOR 8-11. By conditioning one of the inputs of NOR 8-11 with a "one" signal, all further pulses from pulse generator 8 PG are inhibited and the Interval Timer stops counting.

At this time, a function commensurate with the number of wraps which will be uncoiled during deceleration of the uncoiler has been generated. The Accumulator Counter now registers a count representative of the number of wraps which will be uncoiled during deceleration, plus the number of wraps which it is desired to have left when the equipment stops. The number of wraps which are uncoiled between the time of the stop signal generation and the commencement of deceleration must now be registered.

(d) When the Speed Complement counter registers a full 99, the "one" output from NOR 12-01 is applied through inverter 12-14 to enable NOR 12-15. NOR 12-15 controls the output from a pulse generator 12 PG which operates at a predetermined frequency, for example, 120 cycles per second. The pulses from pulse generator 12 PG are applied to a straight binary counter in FIG. 14, comprising stages 14–21, 14–22, 14–23, and 14–24. The function of this straight binary counter is to develop a fixed time interval during which the bridle tachometer pulses may be gated into the Accumulator Counter. The particular period of time selected is determined by the circuit operating characteristics and the time required for the control mechanism to respond to the stop signal. In the instant case, it is assumed that a period of time equivalent to the time required to count 14 pulses from pulse generator 12 PG is required.

When 14 pulses have been received from pulse generator 12 PG stages 14–22, 14–23, and 14–24 reside in a "one" state and stage 14–21 resides in a "zero" state. NOR 14–17 has three inputs, each connected to the "0" output terminals of counter stages 14–22, 14–23, and 14–24. Registration of the number 14 generates a "one" output from NOR 14–17 that is applied to inhibit further counting pulses by conditioning NOR 12–15 via lead 14–18. More important, however, counting by the Accumulator Counter of bridle tachometer pulses is stopped by conditioning one of the inputs of NOR 12–07 with a signal applied over lead 14–19.

(e) The Accumulator Counter now registers a number which is equivalent to the number of revolutions (or a multiple thereof) the uncoiler will make from the instant a stop signal is generated until the uncoiler comes to a halt. Function generated flip-flop 14 FG is set by the application of the signal from the output of NOR 14–17 and when set, flip-flop 14 FG applies a signal over conductor 14–05 to block NOR 13–03.

The Function Generator has now completed its operation and when equal-coincidence is detected by the Size Comparator the Accumulator Counter will count reel tachometer pulses until coincidence is obtained between the number registered therein and the number preset into the Thickness Register.

V. Size Comparator Detects Equal-Coincidence

During the function generation period, the Size Comparator continues to operate, seeking coincidence between the registration of 100 in the Bridle Counter and the registration of 100 in the Reel Counter. Because the Function Generator must be permitted to complete its operation before equal-coincidence is detected, the near-equal-coincidence signal has been generated a sufficient period of time before equal-coincidence occurs. Upon detection of equal-coincidence, the reel tachometer pulses are divided by 10 and counted in the Accumulator Counter. This division is necessary in order to keep a proper numerical place value in comparison with the bridle tachometer output.

If manual operation is selected, the detection of equal-coincidence is effective to actuate the warning horn and cause a signal lamp to flash. This will be discussed hereinafter in connection with the difference between manual operation and automatic operation.

Equal-coincidence manifests itself by simultaneously setting the final or 100 stage of both the Bridle and Reel Counters to a "one" state. Under these conditions, leads 7–08 and 7–46 apply a "zero" to NOR 11–43 which is effective to set the equal-coincidence flip-flop 11 EC. This enables NOR 13–09 to pass reel tachometer pulses to the divider for ultimate application to the Accumulator Counter, and applies a signal to NOR 9–11 which will cause sounding of a warning horn in the event manual operation has been selected.

NOR 13–09 produces a pulse output in response to the interaction of a "zero" on lead 11–46, when equal-coincidence flip-flop 11 EC assumes a "one" state; the reel tachometer pulses from the output of NOR 6–15 over conductor 6–34; and a "zero" on lead 9–10 indicating non-coincidence between the Accumulator Counter and Thickness Register numbers. The pulses from NOR 13–09 drive a decade counter consisting of counter stages 13–11, 13–12, 13–14, and 13–18. This counter is similar to the decades previously considered which utilize a binary-coded-decimal weighting of 1–2–4–8 and recycle automatically upon registration of the tenth count.

The recycling signal, as well as resetting the decade counter, is applied via NOR 13–05 and lead 13–06 to the counting input of the Accumulator Counter. In response to these signals, the Accumulator Counter successively increases the number registered therein until it achieves the value preset into the Thickness Register.

VI. Accumulator Counter Reaches Thickness Data Registration

It will be understood that the number of counts in the Accumulator Counter need not be the number of revolutions that the uncoiler actually makes. In fact, the number of counts taken by the Accumulator Counter will be some multiple of the number of revolutions, the greater the multiple, the greater the resolution of the control system. However, because the particular multiple of the number of revolutions that will occur in the uncoiler is known, the thickness information compensates for this multiple in order to derive the desired results.

The binary-coded representation of the thickness preset for the tens decade, appearing on leads 15–61, 15–62, 15–64, and 15–68, in FIG. 15, is compared in a plurality of NOR gates 15–41, 15–42, 15–44, and 15–48 with the outputs appearing on the respective "1" outputs of the counter stages in the Accumulator Counter's tens decade. When coincidence between the two numbers occurs, NOR 15–59 which is connected to the outputs of each of the latter gates, discretely produces a signal on lead 15–51.

VII. Stop Signal Generated

Similar decimal-to-binary conversion circuits and coincidence gates are associated with each decade of the Accumulator Counter. These are depicted by suitably labeled boxes in FIG. 16. Each decade produces a discrete signal when coincidence has occurred. Detection of this discrete signal from all decades is indicative of complete coincidence between the Accumulator Counter registration and the thickness preset number and causes generation of the stop signal. An additional function of the gates associated with each decade is to produce a discreate signal on a separate lead when the gauge selected requires a zero in a particular decade. For example, gates 15–20 and 15–21 in coincidence gate tens decade 15–07 are effective to provide a signal on lead 15–52 which indicates the coincidence of the zero condition in both the Accumulator Counter tens decade and the Thickness Register tens decade. Similar dual outputs are generated from decades 16–09 and 16–10 of the coincidence gates.

It is assumed that the ten thousands digit handled by this equipment will never exceed two and will never be zero; thus, only two counter elements, 9–12 and 9–13, in FIG. 9, are used to register the ten thousands digit. The coincidence gates and the encoding circuitry associated with these digits is essentially the same as that previously considered, differing only in simplicity due to the requirement for handling fewer figures. In this case, only a single output appears from the coincidence gates because a zero condition is not anticipated.

When compelte coincidence occurs in all decades, gates 9–14, 9–15, 9–16, and 9–17 in FIG. 9, cause a "zero" conditioning of all inputs of NOR 9–18. The resulting signal on the output of NOR 9–18 is discretely indicative of coincidence. The signal is transmitted over lead 9–10 to NOR 13–09 in order to stop counting of the reel tachometer pulses by the Accumulator Counter. It is also applied via NOR gates 9–19, 9–09, 9–20 to deenergize normally-energized relay 9 ASDR. The deenergization of this relay is immediately effective to initiate shutdown operation of the equipment. Further, the "zero" appearing at the output of NOR 9–20 is applied through inverter 9–21, NOR 9–22, and NOR 9–23 to energize warning horn relay 9 WH which is effective to sound a warning horn.

In addition, automatic light relay 9 AL is operated in an obvious circuit from the output of NOR 9–09, including NOR gates 9–24, 9–25, 9–02, and 9–26. This latter light relay may be used to generate flashing impulses as an indication of the stopping operation.

The description of circuit operation hereinbefore deals primarily with automatic operation. In manual operation, the control does not automatically initiate stopping but gives a visual and audible warning when the Size Comparator detects equal-coincidence. The only functional grouping that has significance during manual operation is the Size Comparator. However, at near-equal-coincidence the Function Generator does generate the function which is representative of the number of wraps that will be uncoiled from the instant of stop signal generation, although it is not used. In view of this, the sequence of operations when manual is selected by the Program Selector is exactly the same as that for automatic operation with the exception of the final actuation of warning horn and generation of the stopping signal.

One additional feature of the control system should be noted. If, during automatic operation the line is stopped, after the Size Comparator has detected near-equal-coincidence, means are included for energizing the manual warning lights and the warning horn. This protects against false operation on incorrect data. The circuitry for accomplishing this feature appears in FIG. 10 and includes gates 10–20, 10–21, 10–22, 10–24, 10–25, 10–26, and 10–27. It will be recalled that when NEC is detected, NOR 10–20 receives a "zero" over conductor 7–42. In the case of automatic operation, the other input to NOR 10–20 over conductor 9–03 is also "zero" and consequently, a "one" signal is produced at the output thereof which is transmitted through NOR 10–21 to enable NOR 10–22. The other inputs to NOR 10–22 include: a possible reset lead 10–23; a "zero" signal on 9–06, indicative of not having generated a stop signal; and the output of NOR 10–25 on lead 10–24. NOR 10–25 functions to provide a signal in the event the equipment is stopped. This is accomplished by utilizing two inputs: the first of these is applied directly from the output of NOR 10–22 and is always "zero" unless NOR 10–22 is enabled; the other input is applied over lead 9–05 from inverter 9–04 which produces a "zero" whenever the equipment is running, and a "one" when it stops. This circuit configuration insures that in the event of stoppage of the equipment, NOR 10–22 will produce a "one" at its output. This signal is used to energize relay 10 NCD which may be used to activate any signalling equipment desired. In addition, it is applied over lead 10–28 to inhibit the operation of NOR 9–09 and therefore prevents automatic shutdown of the circuitry.

Furthermore, the signal is converted by inverters 10–27 and 10–26 and applied via conductor 10–29 to inhibit the operation of NOR 9–22 which controls the operation of the warning horn relay 9WH. Thus, in the event of line stoppage, after near-equal-coincidence and before equal-coincidence, the equipment automatically responds by institution of safety measures to prevent improper operation thereafter.

While the above described circuit constitutes a particular embodiment of the invention, it will, of course, be understood that it is not wished to be limited thereto since modifications can be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a system for controlling the unwinding of material from a reel, means for generating a first plurality of pulses having a repetition rate commensurate with the rotational velocity of said reel, rotational means driven at a velocity proportional to the velocity of said material, means for generating a second plurality of pulses having a repetition rate commensurate with the rotational velocity of said rotational means, and means responsive to said first and second plurality of pulses to generate a signal when the repetition rates thereof attain a predetermined proportional relationship.

2. In a system for controlling the unwinding of material from a reel, a detector for detecting the number of wraps remaining on said reel comprising, means registering the number of wraps on a coil of predetermined diameter, rotational means of known diameter coupled to said material and rotating at a velocity proportional to the velocity of said material, means for generating signals individually representative of the velocities of said reel and said rotational means, and comparison means for detecting when the material on said reel is unwound to said predetermined diameter by comparing said signals until the velocity of said reel attains a predetermined proportion of the velocity of said rotational means.

3. In a system for controlling the unwinding of material from a reel, means for generating a first plurality of pulses having a repetition rate commensurate with the rotational velocity of said reel, rotational means of known diameter coupled to said material and rotating at a velocity proportional to the velocity of said material, means for generating a second plurality of pulses having a repetition rate commensurate with the rotational velocity of said rotational means, a first counter responsive to said first plurality of pulses to register a count for each pulse generated, a second counter responsive to said second plurality of pulses to register a count for each pulse generated, and means for comparing the numbers registered in said counters and operative to produce discrete indications when preselected proportions between said numbers are detected after one of said counters attains a predetermined count, whereby each said discrete indication represents a particular diameter of material remaining on the reel.

4. A control system for decelerating apparatus for unwinding material from a coil comprising, means for detecting when a known number of wraps remain on said coil, calculating means responsive to the speed of said material for calculating the number of wraps that will be unwound between the generation of a control signal and the cessation of deceleration of said apparatus, and control means operative following detection of said known number of wraps and controlled in accordance with said calculated number of wraps and to generate said control signal when a number of wraps equal to the difference between said known number and said calculated number have been unwound.

5. A system as defined in claim 4 wherein said calculating means comprises first means responsive to the speed of said material for calculating the number of wraps that will be unwound between generation of said control signal and deceleration of said apparatus, and second means responsive to the speed of said material for calculating the number of wraps that will be unwound during deceleration of said apparatus.

6. A control system for decelerating apparatus for unwinding material from a coil comprising, means for detecting when a known number of wraps remain on said coil, calculating means responsive to the speed of said material for calculating the number of wraps that will be unwound between the generation of a control signal and the cessation of deceleration of said apparatus, means for registering the number of wraps of material to remain on said reel when said deceleration has ceased, means for adding said calculated number and said registered number to obtain the total number of wraps on the reel when said control signal is generated, and control means operative following detection of said known number of wraps and controlled in accordance with said total number of wraps to generate said control signal when a number of wraps equal to the difference between said known number and said total number have been unwound.

7. A system as defined in claim 6 wherein said calculating means comprises, first means responsive to the speed of said material for calculating the number of wraps that will be unwound between generation of said control signal and deceleration of said apparatus, and second means responsive to the speed of said material for calculating the number of wraps that will be unwound during deceleration of said apparatus.

8. A control system for decelerating apparatus for unwinding material from a coil comprising, means for detecting when a known number of wraps remain on said coil, a counter, first calculating means operative before said known number of wraps is detected and responsive to the speed of said material to register a first number in said counter that is a function of the square of said speed, second calculating means operative before said known number of wraps is detected and responsive to the speed of said material to increase the number registered in said counter by a second number that is a function of said speed, means operative upon detection of said known number of wraps and responsive to the rotational speed of said coil to increase the number registered in said counter at a rate determined by said rotational speed, and comparison means for comparing the number registered in said counter with a multiple of said known number of wraps and generating a control signal to decelerate said apparatus when a predetermined relationship between said numbers is detected.

9. A control system as defined in claim 8 in combination with means operative before operation of said first calculating means to register a number in said counter that is a multiple of the number of wraps of material to be left on said reel upon cessation of deceleration.

10. A control system for decelerating apparatus for unwinding material from a coil comprising, means for generating a first plurality of pulses having a repetition rate commensurate with the rotational velocity of said coil, rotational means of known diameter coupled to said material and rotating at a velocity proportional to the velocity of said material, means for generating a second plurality of pulses having a repetition rate commensurate with the rotational velocity of said rotational means, means responsive to said first and second plurality of pulses for detecting when a predetermined diameter of coil remains, first counting means operative before said predetermined diameter is detected to count said second plurality of pulses for a fixed time interval, second counting means, means controlled by said first counting means and operative upon elapse of said fixed time interval to register the nines complement of the number in said first counting means in said second counting means, means successively operative with a period equal to said fixed time interval to increase the number registered in said second counter by one number for each said time interval until said second counter is full, and third counting means responsive to count said second plurality of pulses from the elapse of the first of said fixed time intervals until said second counter is full, whereby said third counting means registers a number that is a function of the square of the velocity of said material.

11. A control system as defined in claim 10 in combination with means operative after said second counter is full for generating a time interval equivalent to the period between generation of a control signal for decelerating said apparatus and response of said apparatus to said signal, and means for rendering said third counting means responsive to count said second plurality of pulses during said generated time interval.

12. A control system as defined in claim 11 in combination with means operative before operation of said first counting means to register a number in said third counting means that is a multiple of the number of wraps of material to be left on said coil upon cessation of deceleration.

13. A control system as defined in claim 12 in combination with, means operative when said predetermined diameter of coil is detected to render said third counting means responsive to count said first plurality of pulses, means for registering a multiple of the number of wraps of material on said coil when said predetermined diameter is detected, and comparison means for comparing said registered number with the number registered in said third counting means and generating said control signal when the compared numbers bear a predetermined relation to one another.

References Cited by the Examiner
UNITED STATES PATENTS

| | | | |
|---|---|---|---|
| 2,469,706 | 5/49 | Winther | 242—75.51 |
| 2,584,734 | 2/52 | Owens | 242—57 |
| 2,666,597 | 1/54 | Wood | 242—74.4 |
| 2,760,137 | 8/56 | Andrews | 242—55.11 |
| 2,838,253 | 6/58 | Jacobsen | 242—75.51 |
| 2,874,900 | 2/59 | Linderman | 235—103 |
| 2,876,004 | 3/59 | Sink | 226—42 |
| 2,892,597 | 6/59 | Schmidt | 242—75.42 |
| 2,972,452 | 2/61 | Aumann | 242—75.43 |
| 3,043,589 | 7/62 | Folmar | 226—42 X |

MERVIN STEIN, *Primary Examiner.*

JOSEPH P. STRIZAK, *Examiner.*